(12) United States Patent
Takahama et al.

(10) Patent No.: US 11,230,825 B2
(45) Date of Patent: Jan. 25, 2022

(54) DISPLAY SYSTEM, DISPLAY METHOD, AND DISPLAY APPARATUS

(71) Applicant: Komatsu Ltd., Tokyo (JP)

(72) Inventors: Kazuhisa Takahama, Tokyo (JP); Yukinori Matsumura, Tokyo (JP)

(73) Assignee: Komatsu Ltd., Tokyo (JP)

(*) Notice: Subject to any disclaimer, the term of this patent is extended or adjusted under 35 U.S.C. 154(b) by 202 days.

(21) Appl. No.: 16/491,002

(22) PCT Filed: Jun. 25, 2018

(86) PCT No.: PCT/JP2018/024065
§ 371 (c)(1),
(2) Date: Sep. 4, 2019

(87) PCT Pub. No.: WO2019/054000
PCT Pub. Date: Mar. 21, 2019

(65) Prior Publication Data
US 2020/0018049 A1  Jan. 16, 2020

(30) Foreign Application Priority Data

Sep. 15, 2017 (JP) .............................. JP2017-178316

(51) Int. Cl.
*E02F 9/26* (2006.01)
*E02F 9/20* (2006.01)
(Continued)

(52) U.S. Cl.
CPC ............ *E02F 9/264* (2013.01); *E02F 9/2025* (2013.01); *B60Y 2200/412* (2013.01); *E02F 3/32* (2013.01); *H04Q 9/00* (2013.01)

(58) Field of Classification Search
CPC . E02F 9/264; E02F 9/2025; E02F 3/32; E02F 9/205; E02F 9/261; B60Y 2200/412; H04Q 9/00; H04N 7/183
See application file for complete search history.

(56) References Cited

U.S. PATENT DOCUMENTS 8,965,642 B2 2/2015 Johnson et al.
10,829,910 B2 11/2020 Yoshinada et al.
(Continued)

FOREIGN PATENT DOCUMENTS

JP  2013-168776 A  8/2013
JP  2013-168826 A  8/2013
(Continued)

OTHER PUBLICATIONS

Office Action dated Sep. 3, 2020, issued in the corresponding Australian patent application No. 2018333191.
(Continued)

*Primary Examiner* — Russell Frejd
(74) *Attorney, Agent, or Firm* — Locke Lord LLP

(57) ABSTRACT

A display system includes: a work machine image generation unit that generates, on the basis of detection data of a position of a work machine including working equipment and detection data of attitude of the work machine, a work machine image representing a virtual viewpoint image of the work machine viewed from a virtual viewpoint outside the work machine; a transport vehicle image generation unit that generates, on the basis of detection data of a position of a transport vehicle and detection data of attitude of the transport vehicle, a transport vehicle image representing a virtual viewpoint image of the transport vehicle viewed from the virtual viewpoint; a combining unit that generates a combined image in which the work machine image and the transport vehicle image are superimposed; and a display control unit that causes the combined image to be displayed on a display apparatus present outside the work machine.

8 Claims, 15 Drawing Sheets

(51) Int. Cl.
E02F 3/32 (2006.01)
H04Q 9/00 (2006.01)

(56) References Cited

U.S. PATENT DOCUMENTS

| | | |
|---|---|---|
| 2007/0165033 A1 | 7/2007 | Matsuno et al. |
| 2014/0100744 A1 | 4/2014 | Johnson et al. |
| 2016/0006947 A1 | 1/2016 | Kowatari et al. |
| 2016/0224026 A1 | 8/2016 | Hamada et al. |
| 2018/0051446 A1 | 2/2018 | Yoshinada et al. |
| 2020/0399869 A1 | 12/2020 | Yoshinada et al. |

FOREIGN PATENT DOCUMENTS

| | | |
|---|---|---|
| JP | 2015-21246 A | 2/2015 |
| JP | 2016-65769 A | 4/2016 |
| JP | 2016-89388 A | 5/2016 |
| JP | 2016-160741 A | 9/2016 |
| WO | 2005/071619 A1 | 8/2005 |
| WO | 2014/054354 A1 | 4/2014 |
| WO | 2014/123228 A1 | 8/2014 |
| WO | 2015/008751 A1 | 1/2015 |

OTHER PUBLICATIONS

International Search Report dated Aug. 28, 2018, issued for PCT/JP2018/024065.

DISPLAY SYSTEM, DISPLAY METHOD, AND DISPLAY APPARATUS

FIELD

The present invention relates to a display system, a display method, and a display apparatus.

BACKGROUND

There are known techniques for remotely controlling a work machine. In performing remote control of a work machine, a work site is imaged by an imaging device. The image of the work site imaged by the imaging device is displayed on a display apparatus provided in a remote control facility. The operator operates a remote controller while watching the image of the work site displayed on the display apparatus.

Patent Literature 1 discloses a technique of imaging a work site with a camera provided in a work machine while imaging conditions of the work machine from the outside with a camera installed at the work site.

CITATION LIST

Patent Literature

[Patent Literature 1] JP 2013-168776 A

SUMMARY

Technical Problem

In a case where an image displayed on the display apparatus is a two-dimensional image when a work machine is remotely controlled, the operator might have difficulty in obtaining perspective of the work site. Difficulty in obtaining perspective of the work site would lead to difficulty for the operator to grasp the distance between the work machine and a transport vehicle in case of performing loading work onto the transport vehicle using the work machine. This might result in reduction in work efficiency of remote control.

An aspect of the present invention is to provide a technology that allows an operator to remotely control a work machine comfortably and suppresses the reduction in work efficiency.

Solution to Problem

According to an aspect of the present invention, a display system comprises: a work machine image generation unit that generates, on the basis of detection data of a position of a work machine including working equipment and detection data of attitude of the work machine, a work machine image representing a virtual viewpoint image of the work machine, viewed from a virtual viewpoint outside the work machine; a transport vehicle image generation unit that generates, on the basis of detection data of a position of a transport vehicle and detection data of attitude of the transport vehicle, a transport vehicle image representing a virtual viewpoint image of the transport vehicle viewed from the virtual viewpoint; a combining unit that generates a combined image in which the work machine image and the transport vehicle image are superimposed; and a display control unit that causes the combined image to be displayed on a display apparatus present outside the work machine.

Advantageous Effects of Invention

According to an aspect of the present invention, it is possible to provide a technology enabling the operator to remotely control a work machine comfortably and enabling suppression of the reduction in work efficiency.

DESCRIPTION OF EMBODIMENTS

Hereinafter, embodiments according to the present invention will be described with reference to the drawings, although the present invention is not limited to the embodiments. It is possible to appropriately combine the constituents described in the embodiments below. In some cases, a portion of the constituents is not utilized.

[Overview of Work Machine, Remote Control System, and Transport Vehicle]

Figure 1:
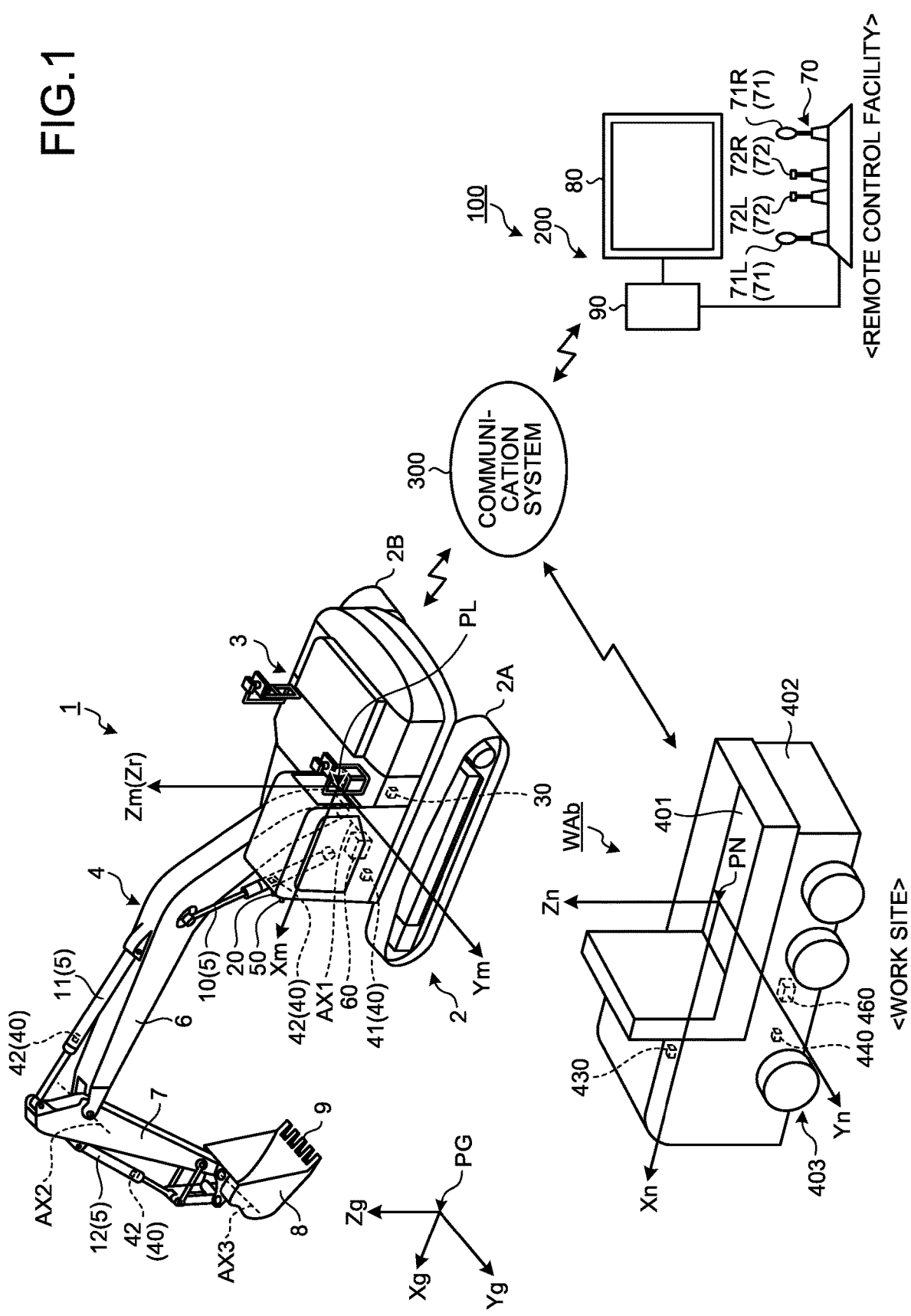
FIG. 1 is a view schematically illustrating an example of a remote control system of a work machine according to the present embodiment.

FIG. 1 is a view schematically illustrating an example of a remote control system 100 of a work machine 1 according to the present embodiment. The remote control system 100 remotely controls the work machine 1. In the present embodiment, the work machine 1 is an excavator. In the following description, the work machine 1 will be appropriately referred to as an excavator 1.

The excavator 1 includes a carriage 2, a swing body 3, working equipment 4, a hydraulic cylinder 5, a distance detection device 20, a position detection device 30 (first position detection device), and an attitude detection device 40 (first attitude detection device), an imaging device 50, and a control device 60. The excavator 1 is located at a work site and works at the work site.

In the present embodiment, a vehicle body coordinate system (Xm-Ym-Zm coordinate system) is defined in the swing body 3. The vehicle body coordinate system is a three-dimensional coordinate system that represents a relative position with respect to an origin PL defined on the swing body 3. The vehicle body coordinate system of the swing body 3 is defined by an Xm axis of a first reference plane with respect to the origin PL, a Ym axis orthogonal to the Xm axis in the first reference plane, and a Zm axis orthogonal to the first reference plane. A direction parallel to the Xm axis is defined as an Xm axis direction, a direction parallel to the Ym axis is defined as a Ym axis direction, and a direction parallel to the Zm axis is defined as a Zm axis direction. The Xm-axis direction is a front-rear direction of the swing body 3, the Ym-axis direction is a left-right direction of the swing body 3, and the Zm-axis direction is an up-down direction of the swing body 3.

The carriage 2 includes crawlers 2A and 2B. The excavator 1 travels by rotation of the crawlers 2A and 2B. The Zm axis of the vehicle body coordinate system is orthogonal to a ground plane of the crawlers 2A and 2B. A +Zm direction of the vehicle body coordinate system is an upper direction of the swing body 3, a direction away from the ground plane of the crawlers 2A and 2B. A −Zm direction of the vehicle body coordinate system is a lower direction of the swing body 3, a direction opposite to the +Zm direction.

The swing body 3 is swivelably supported by the carriage 2. The swing body 3 is swivelable around a swivel axis Zr. The swivel axis Zr is parallel to the Zm axis of the vehicle body coordinate system. The origin PL of the vehicle body coordinate system is defined at a center of a swing circle of the swing body 3. The center of the swing circle is located at the swivel axis Zr of the swing body 3.

The working equipment 4 is supported by the swing body 3. In the vehicle body coordinate system, at least a portion of the working equipment 4 is disposed in the +Xm direction relative to the swing body 3. The +Xm direction of the vehicle body coordinate system is a forward direction of the swing body 3, a direction in which a tip 9 of the working equipment 4 exists with reference to the swing body 3. The −Xm direction of the vehicle body coordinate system is a backward direction of the swing body 3, a direction opposite to the +Xm direction.

The working equipment 4 has a boom 6 connected to the swing body 3, an arm 7 connected to the boom 6, and a bucket 8 connected to the arm 7. The tip 9 of the working equipment 4 includes a blade edge of the bucket 8. The tip 9 of the working equipment 4 may be a tip of a blade of the bucket 8.

The hydraulic cylinder 5 generates power for driving the working equipment 4. The hydraulic cylinder 5 is driven by hydraulic oil supplied from a hydraulic pump. The hydraulic cylinder 5 includes a boom cylinder 10 that drives the boom 6, an arm cylinder 11 that drives the arm 7, and a bucket cylinder 12 that drives the bucket 8.

The boom 6 is rotatably connected to the swing body 3 around a rotation axis AX1. The arm 7 is rotatably connected to the tip of the boom 6 around a rotation axis AX2. The bucket 8 is rotatably connected by the tip of the arm 7 around a rotation axis AX3. The rotation axis AX1 of the boom 6, the rotation axis AX2 of the arm 7, and the rotation axis AX3 of the bucket 8 are parallel to the Ym axis of the vehicle body coordinate system. The +Ym direction of the vehicle body coordinate system is the left direction of the swing body 3. The −Ym direction of the vehicle body coordinate system is a direction opposite to the +Ym direction, a rightward direction of the swing body 3.

The distance detection device 20 is mounted on the excavator 1. The distance detection device 20 detects a distance Ld to a target WAa around the excavator 1 (refer to FIG. 9).

Examples of the target WAa include at least one of a construction target to be constructed at the work site, the ground surface, at least a part of the working equipment 4 existing in the forward direction with respect to the swing body 3, a structure, and a work machine other than the excavator 1.

In the present embodiment, the distance detection device 20 includes a laser range finder. The distance detection device 20 includes an emitting unit that emits laser light being detection light, and a light reception unit that receives the reflected laser light emitted onto the target WAa. The distance detection device 20 is provided on an upper portion of the swing body 3. The light reception unit of the distance detection device 20 faces a forward direction (+Xm direction) of the swing body 3. The distance detection device 20 detects the distance Ld between the swing body 3 and the target WAa in the forward direction. Detection data of the distance detection device 20 is output to the control device 60.

The position detection device 30 is mounted on the excavator 1. The position detection device 30 detects a position Pa of the swing body 3 of the excavator 1 in a global coordinate system (Xg-Yg-Zg coordinate system). The global coordinate system is a three-dimensional coordinate system based on an origin PG defined on the earth, being a coordinate system indicating absolute positions defined by a Global Navigation Satellite System (GNSS) such as the Global Positioning System (GPS) The position detection device 30 is provided on the swing body 3. The position detection device 30 uses the GNSS to detect the position Pa of the swing body 3. Detection data of the position detection device 30 is output to the control device 60.

The attitude detection device 40 is mounted on the excavator 1. The attitude detection device 40 detects attitude of the excavator 1. The attitude of the excavator 1 includes the attitude of the swing body 3 and the attitude of the working equipment 4. The attitude of the swing body 3 includes an inclination angle of the swing body 3. The attitude of the working equipment 4 includes an inclination angle of the working equipment 4. The attitude detection device 40 includes a swing body attitude sensor 41 that detects attitude of the swing body 3 and a working equipment attitude sensor 42 that detects attitude of the working equipment 4. Detection data of the attitude detection device 40 is output to the control device 60.

In the present embodiment, the swing body attitude sensor 41 includes an inertial measurement unit (IMU) provided on the swing body 3. The working equipment attitude sensor 42 includes a stroke sensor that detects a cylinder stroke that indicates an operation amount of the hydraulic cylinder 5.

The imaging device 50 is mounted on the excavator 1. The imaging device 50 images a target WAa around the excavator 1 and obtains an image of the target WAa. The imaging device 50 includes an optical system and an image sensor that receives light passing through the optical system. Examples of image sensors include a couple charged device (CCD) image sensor and a complementary metal oxide semiconductor (CMOS) image sensor.

In the present embodiment, the imaging device 50 is a monocular camera. The imaging device 50 is disposed on the upper part of the swing body 3. An incident surface of an optical system of the imaging device 50 faces the forward direction (+Xm direction) of the swing body 3. The imaging device 50 obtains an image of the target WAa in the forward direction of the swing body 3. In the present embodiment, the imaging device 50 can obtain an image of at least a portion of the working equipment 4 present in the forward direction with respect to the swing body 3. Image data of the target WAa obtained by the imaging device 50 is output to the control device 60.

Hereinafter, an image obtained by the imaging device 50 will be appropriately referred to as a real image RG. The real image RG represents an actual image of a work site captured by the imaging device 50. The real image RG is a two-dimensional image.

The remote control system 100 includes: a remote controller 70 provided at a remote control facility existing outside the excavator 1; and a display system 200 that displays, at the remote control facility, an image of the target WAa and a transport vehicle WAb present at the work site.

The display system 200 includes: a display apparatus 80 existing outside the excavator 1; and a control device 90 existing outside the excavator 1 and capable of communicating with the excavator 1. Each of the remote controller 70, the display apparatus 80, and the control device 90 is installed at a remote control facility. Each of the remote controller 70, the display apparatus 80, and the control device 90 is installed separately from the excavator 1 and the transport vehicle WAb.

The control device 60 mounted on the excavator 1 and the control device 90 installed in the remote control facility communicate with each other via a communication system 300. The communication system 300 may perform wired communication or wireless communication. The communication system 300 includes at least one of the Internet, a local area network (LAN), a mobile telephone communication network, and a satellite communication network.

The excavator 1 is remotely controlled by the remote controller 70. The remote controller 70 includes: a work lever 71 for remotely operating the swing body 3 and the working equipment 4 of the excavator 1; and a carriage lever 72 for remotely operating the carriage 2. The operator operates the remote controller 70 at the remote control facility. An operation signal generated by operating the remote controller 70 is transmitted to the control device 60 via the communication system 300. The control device 60 outputs a control signal for controlling the swing body 3, the working equipment 4, and the carriage 2 on the basis of the operation signal. This leads to remote controlled operation of the excavator 1.

The work lever 71 includes a left work lever 71L and a right work lever 71R manipulated to operate the swing body 3 and the working equipment 4. The carriage lever 72 includes a left carriage lever 72L and a right carriage lever 72R manipulated to operate the carriage 2.

At the work site, the transport vehicle WAb operates. The transport vehicle WAb is a dump truck, and includes: a loading platform 401; a vehicle body 402 that supports the loading platform 401; a carriage device 403 that supports the vehicle body 402; a position detection device 430 (second position detection device); an attitude detection device 440 (second attitude detection device); and a control device 460. The carriage device 403 includes a wheel supporting a tire and a steering device.

A driver rides the transport vehicle WAb. The transport vehicle WAb is operated by the driver. The excavator 1 excavates a construction target using the working equipment 4 and loads a cargo generated by the excavation onto the transport vehicle WAb. The transport vehicle WAb transports the cargo loaded by the excavator 1.

Note that the driver need not ride the transport vehicle WAb. That is, the transport vehicle WAb may be an unmanned transport vehicle (unmanned dump truck) that travels on the basis of a command signal transmitted from a management system, for example.

In the present embodiment, a vehicle body coordinate system (Xn-Yn-Zn coordinate system) is defined on the vehicle body 402. The vehicle body coordinate system is a three-dimensional coordinate system that indicates a relative position with respect to an origin PN defined on the vehicle body 402. The vehicle body coordinate system of the vehicle body 402 is defined by an Xn axis of a fourth reference plane with respect to the origin PN, a Yn axis orthogonal to the Xn axis in the fourth reference plane, and a Zn axis orthogonal to the fourth reference plane. A direction parallel to the Xn axis is defined as an Xn axis direction, a direction parallel to the Yn axis is defined as a Yn axis direction, and a direction parallel to the Zn axis is defined as a Zn axis direction. The Xn axis direction is a front-rear direction of the vehicle body 402, the Yn axis direction is a left-right direction of the vehicle body 402, and the Zn axis direction is an up-down direction of the vehicle body 402.

The position detection device 430 is mounted on the transport vehicle WAb. The position detection device 430 detects a position Pb of the transport vehicle WAb in the global coordinate system (Xg-Yg-Zg coordinate system). The position detection device 430 is provided on the vehicle body 402. The position detection device 430 detects the position Pb of the vehicle body 402 using the GNSS. Detection data of the position detection device 430 is output to the control device 460.

attitude detection device 440 is mounted on transport vehicle WAb. The attitude detection device 440 detects the attitude of the transport vehicle WAb. The attitude of the transport vehicle WAb includes the attitude of the vehicle body 402. The attitude of the vehicle body 402 includes the inclination angle of the vehicle body 402. Detection data of the attitude detection device 440 is output to the control device 460. In the present embodiment, the attitude detection device 440 includes an inertial measurement unit (IMU) installed on the vehicle body 402.

The control device 460 mounted on the transport vehicle WAb and the control device 90 installed in the remote control facility communicate with each other via the communication system 300.

[Working Machine]

Figure 2:
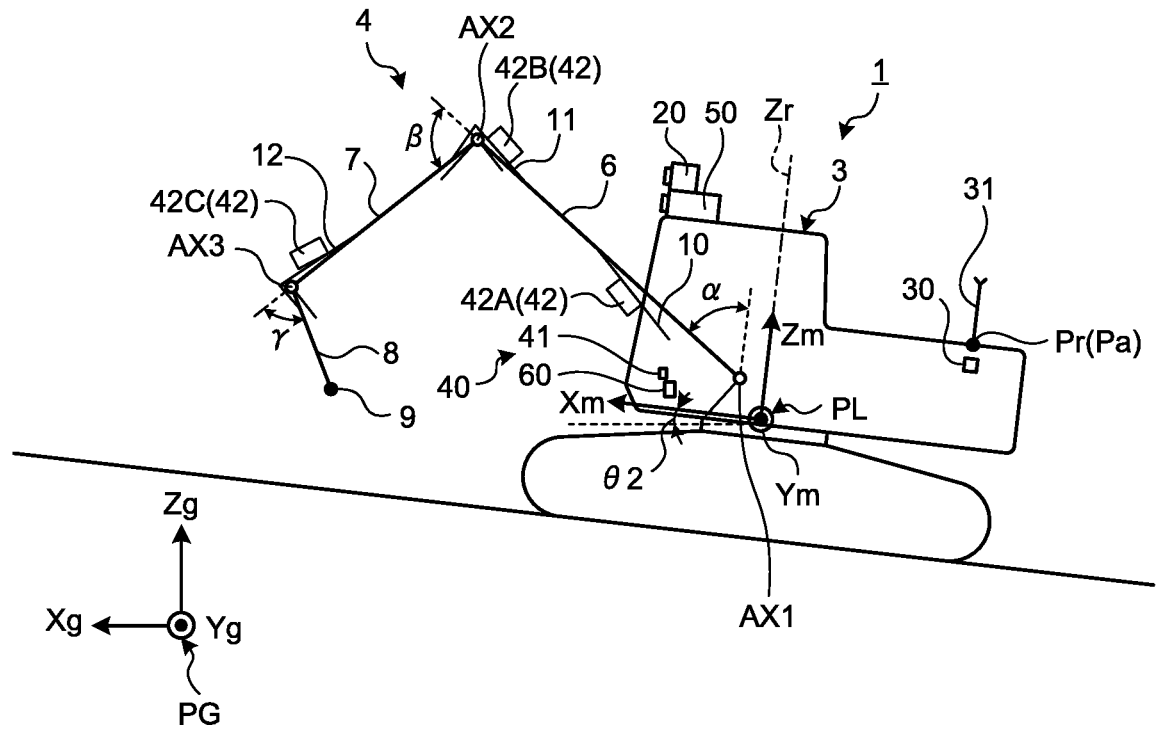
FIG. 2 is a side view schematically illustrating the work machine according to the present embodiment.
Figure 3:
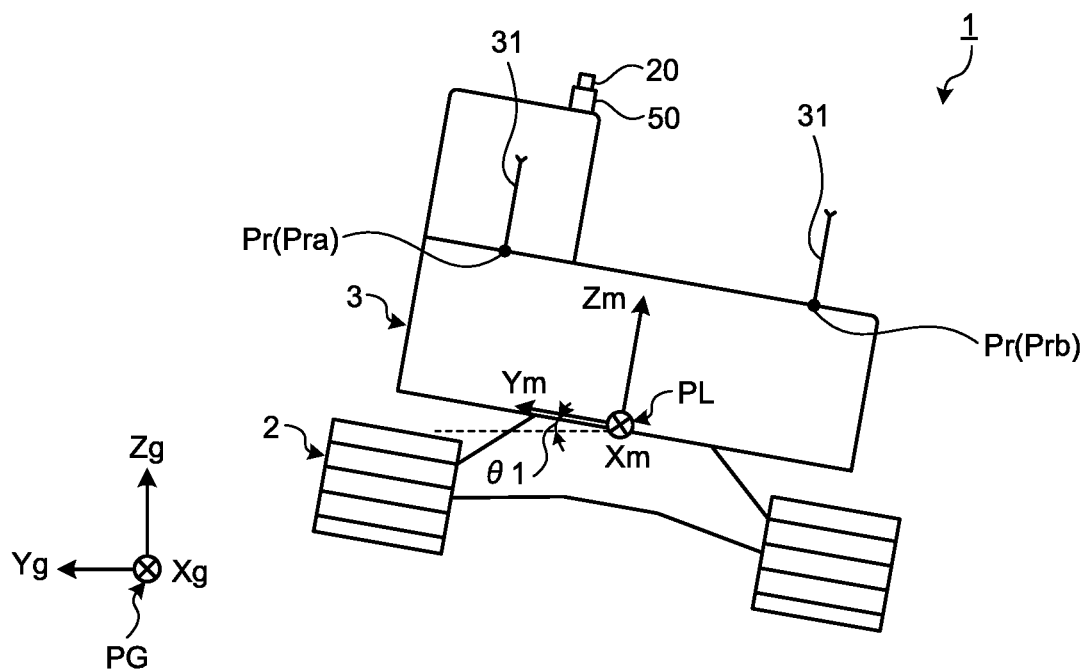
FIG. 3 is a rear view schematically illustrating the work machine according to the present embodiment.
Figure 4:
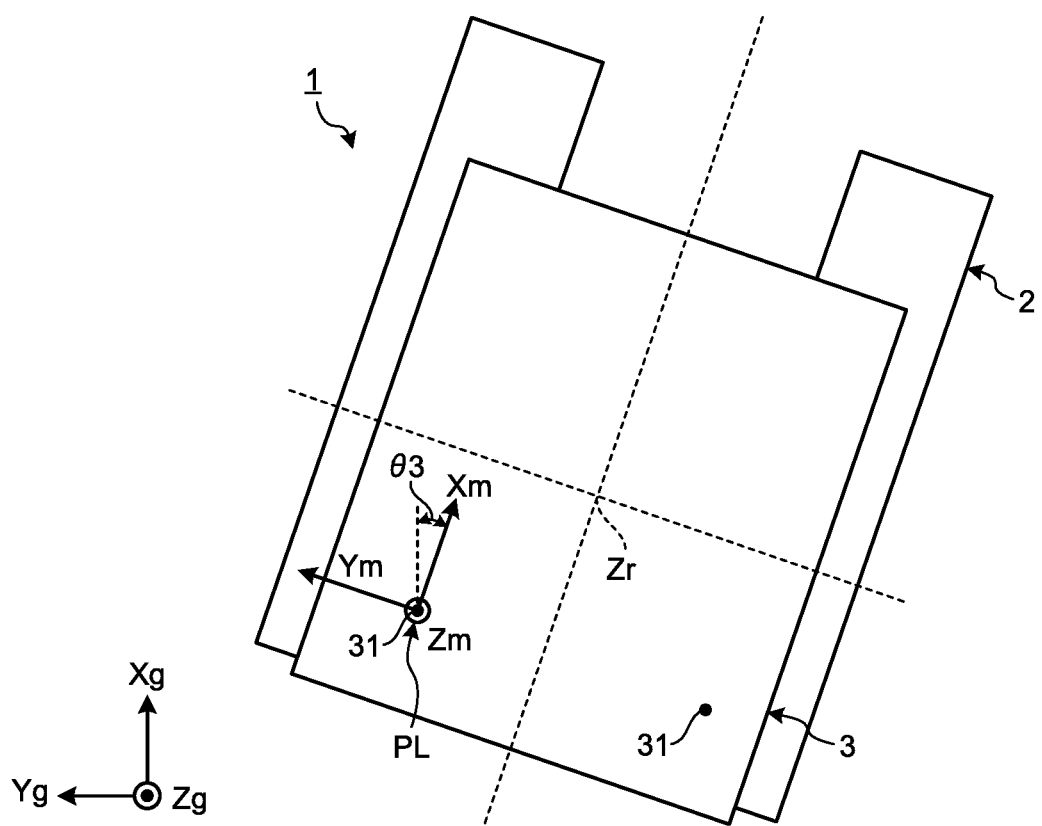
FIG. 4 is a plan view schematically illustrating the work machine according to the present embodiment.

FIG. 2 is a side view schematically illustrating the excavator 1 according to the present embodiment. FIG. 3 is a rear view schematically illustrating the excavator 1 according to the present embodiment. FIG. 4 is a plan view schematically illustrating the excavator 1 according to the present embodiment.

As illustrated in FIGS. 2, 3, and 4, the excavator 1 includes: the distance detection device 20; the position detection device 30; the attitude detection device 40 including the swing body attitude sensor 41 and the working equipment attitude sensor 42; the imaging device 50; and the control device 60.

The swing body 3 includes a plurality of GPS antennas 31. The GPS antenna 31 receives a radio wave from a GPS satellite and outputs a signal generated on the basis of the received radio wave to the position detection device 30. The position detection device 30 detects a position Pr where the GPS antenna 31 defined in the global coordinate system is installed, on the basis of the signal from the GPS antenna 31. The position detection device 30 detects the position Pa of the swing body 3 in the global coordinate system on the basis of the position Pr where the GPS antenna 31 is installed.

Two GPS antennas 31 are provided in the left-right direction. The position detection device 30 detects each of a position Pra where one GPS antenna 31 is installed and a position Prb where the other GPS antenna 31 is installed. The position detection device 30 performs arithmetic processing on the basis of at least one of the position Pra and the position Prb and thereby detects the position Pa of the swing body 3 in the global coordinate system. In the present embodiment, the position Pa of the swing body 3 is the position Pra. Note that the position Pa of swing body 3 may be the position Prb or may be a position between the position Pra and the position Prb.

The swing body attitude sensor 41 includes an inertial measurement unit (IMU). The swing body attitude sensor 41 detects an inclination angle of the swing body 3 with respect to the Xg-Yg plane (horizontal plane) defined by the global coordinate system. Inclination angles of the swing body 3 include: a roll angle θ1 indicating an inclination angle of the swing body 3 in the left-right direction with respect to a horizontal plane; a pitch angle θ2 indicating an inclination angle of the swing body 3 in the front-back direction with respect to the horizontal plane; and a yaw angle θ3 indicating an inclination angle of the swing body 3 in the rotational direction around the Zm axis. The roll angle θ1, the pitch angle θ2, and the yaw angle θ3 are calculated by time-integrating the angular velocity detected by the inertial measurement unit. The yaw angle θ3 changes with swivel movement of the swing body 3. In a case where the swing body 3 swivels while the carriage 2 is stopped, the yaw angle θ3 corresponds to a swivel angle of the swing body 3.

The attitude of the swing body 3 includes at least one of the roll angle θ1, the pitch angle θ2, and the yaw angle θ3.

Note that the yaw angle θ3 may be detected by the position detection device 30. The position detection device 30 can detect orientation of the swing body 3 with respect to reference orientation in the global coordinate system on the basis of the position Pra of one GPS antenna 31 and the position Prb of the other GPS antenna 31. The position detection device 30 performs arithmetic processing on the basis of the position Pra and the position Prb and thereby detects orientation of the swing body 3 with respect to the reference orientation. An angle between the reference orientation and the orientation of the swing body 3 corresponds to the yaw angle θ3. The position detection device 30 can calculate a straight line connecting the position Pra and the position Prb, and can detect the yaw angle θ3 on the basis of the angle formed by the calculated straight line and the reference orientation.

The working equipment attitude sensor 42 includes a stroke sensor. The working equipment attitude sensor 42 detects an inclination angle of the working equipment 4 defined by the vehicle body coordinate system. The stroke sensor includes: a boom stroke sensor 42A that detects a cylinder stroke of the boom cylinder 10; an arm stroke sensor 42B that detects a cylinder stroke of the arm cylinder 11; and a bucket stroke sensor 42C that detects a cylinder stroke of the bucket cylinder 12. The control device 60 calculates an inclination angle α of the boom 6 with respect to the Zm axis of the vehicle body coordinate system on the basis of the detection data of boom stroke sensor 42A. The control device 60 calculates an inclination angle β of the arm 7 with respect to the boom 6 on the basis of the detection data of the arm stroke sensor 42B. The control device 60 calculates an inclination angle γ of the bucket 8 with respect to the arm 7 on the basis of the detection data of the bucket stroke sensor 42C.

Attitude of the working equipment 4 includes at least one of the inclination angle α, the inclination angle β, and the inclination angle γ.

[Transport Vehicle]

Figure 5:
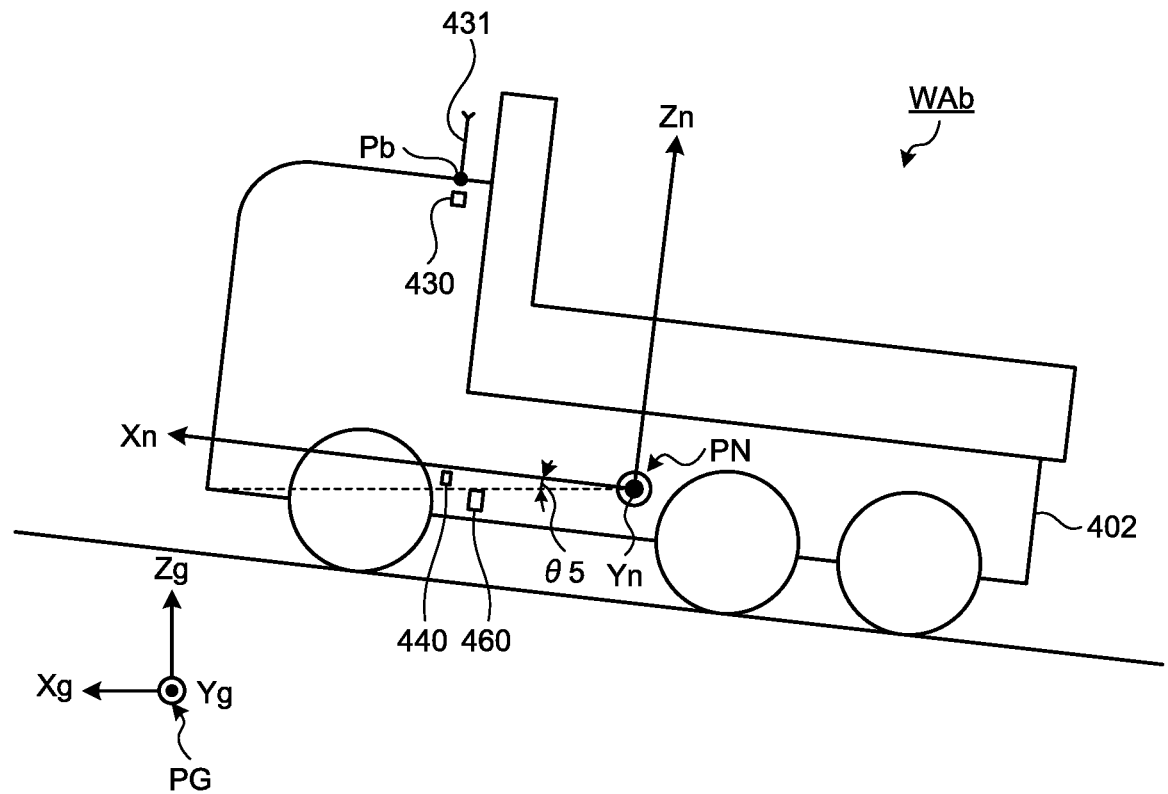
FIG. 5 is a side view schematically illustrating a transport vehicle according to the present embodiment.
Figure 6:
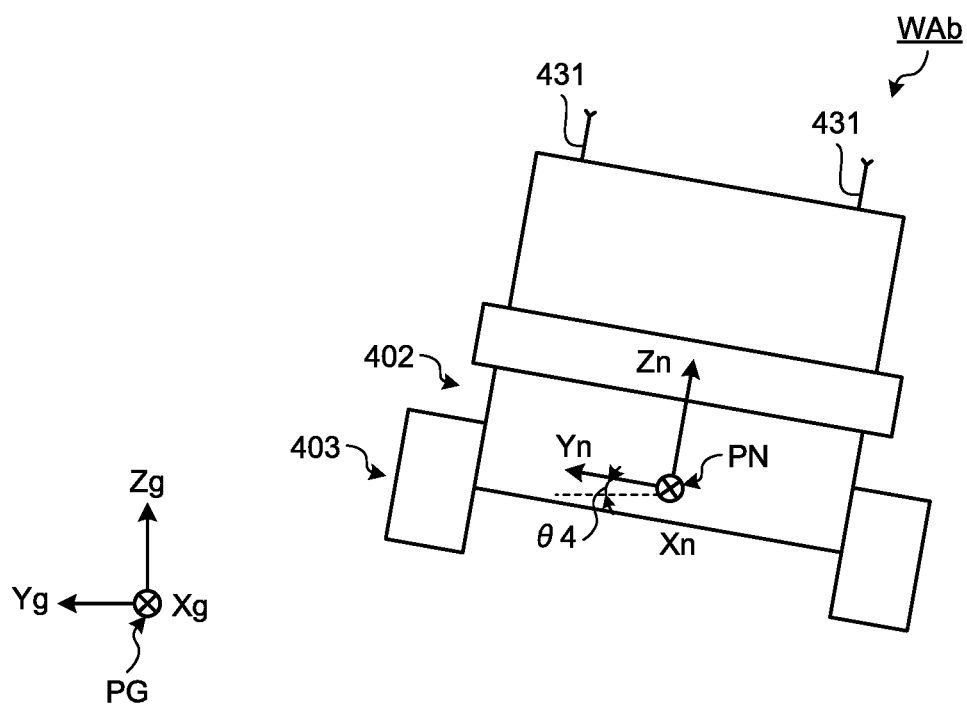
FIG. 6 is a rear view schematically illustrating the transport vehicle according to the present embodiment.
Figure 7:
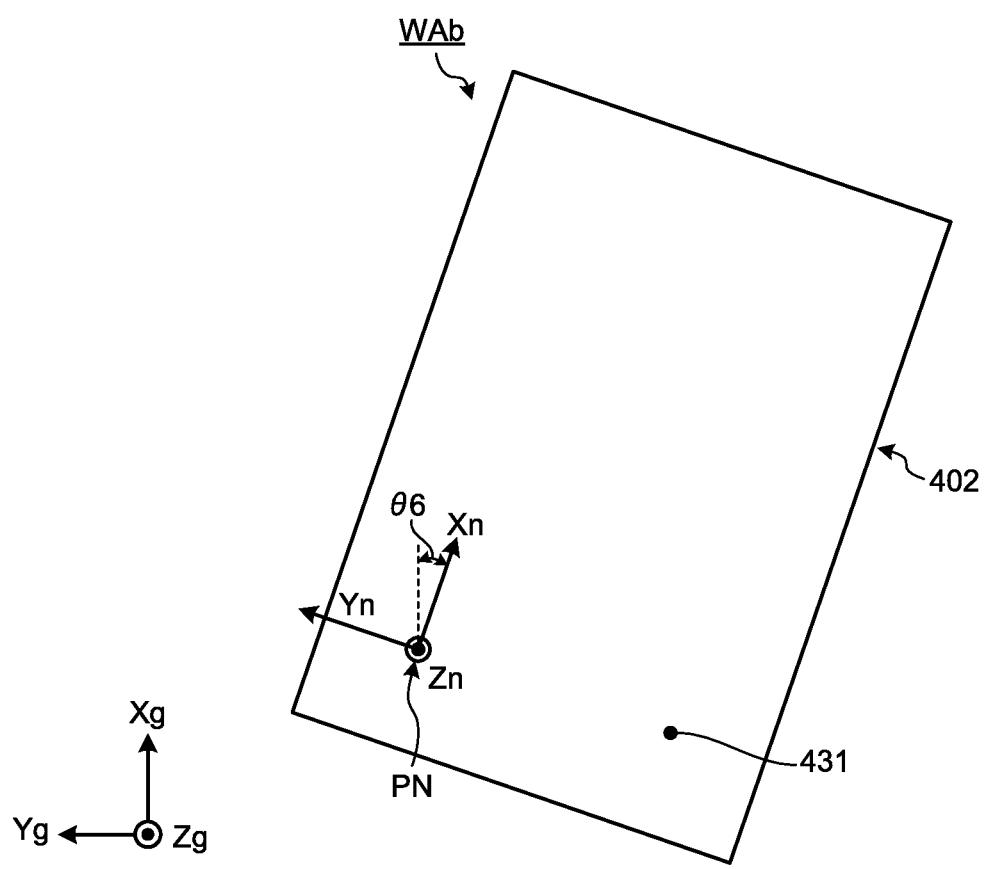
FIG. 7 is a plan view schematically illustrating the transport vehicle according to the present embodiment.

FIG. 5 is a side view schematically illustrating the transport vehicle WAb according to the present embodiment. FIG. 6 is a rear view schematically illustrating the transport vehicle WAb according to the present embodiment. FIG. 7 is a plan view schematically illustrating the transport vehicle WAb according to the present embodiment.

As illustrated in FIGS. 5, 6, and 7, the transport vehicle WAb includes a position detection device 430, an attitude detection device 440, and a control device 460.

The vehicle body 402 includes a plurality of GPS antennas 431. The position detection device 430 detects a position where the GPS antenna 431 defined in the global coordinate system is installed, on the basis of the signal from the GPS antenna 431. The position detection device 430 detects the position Pb of the vehicle body 402 in the global coordinate system on the basis of the position where the GPS antenna 431 is installed.

The attitude detection device 440 includes an inertial measurement unit (IMU). The attitude detection device 440 detects an inclination angle of the vehicle body 402 with respect to the Xg-Yg plane (horizontal plane) defined by the global coordinate system. Inclination angles of the vehicle body 402 include: a roll angle θ4 indicating an inclination angle of the vehicle body 402 in the left-right direction with respect to the horizontal plane; a pitch angle θ5 indicating an inclination angle of the vehicle body 402 in the front-rear direction with respect to the horizontal plane; and a yaw angle θ6 indicating an inclination angle of the vehicle body 402 in the rotational direction around the Zn axis. The roll angle θ4, the pitch angle θ5, and the yaw angle θ6 are calculated by time-integrating the angular velocity detected by the inertial measurement unit. Note that the yaw angle θ6 may be detected by the position detection device 430. The yaw angle θ6 changes with swivel movement of the vehicle body 402.

The attitude of the vehicle body 402 includes at least one of the roll angle θ4, the pitch angle θ5, and the yaw angle θ6. The yaw angle θ6 changes with swivel movement of the vehicle body 402.

[Coordinate System]

Figure 8:
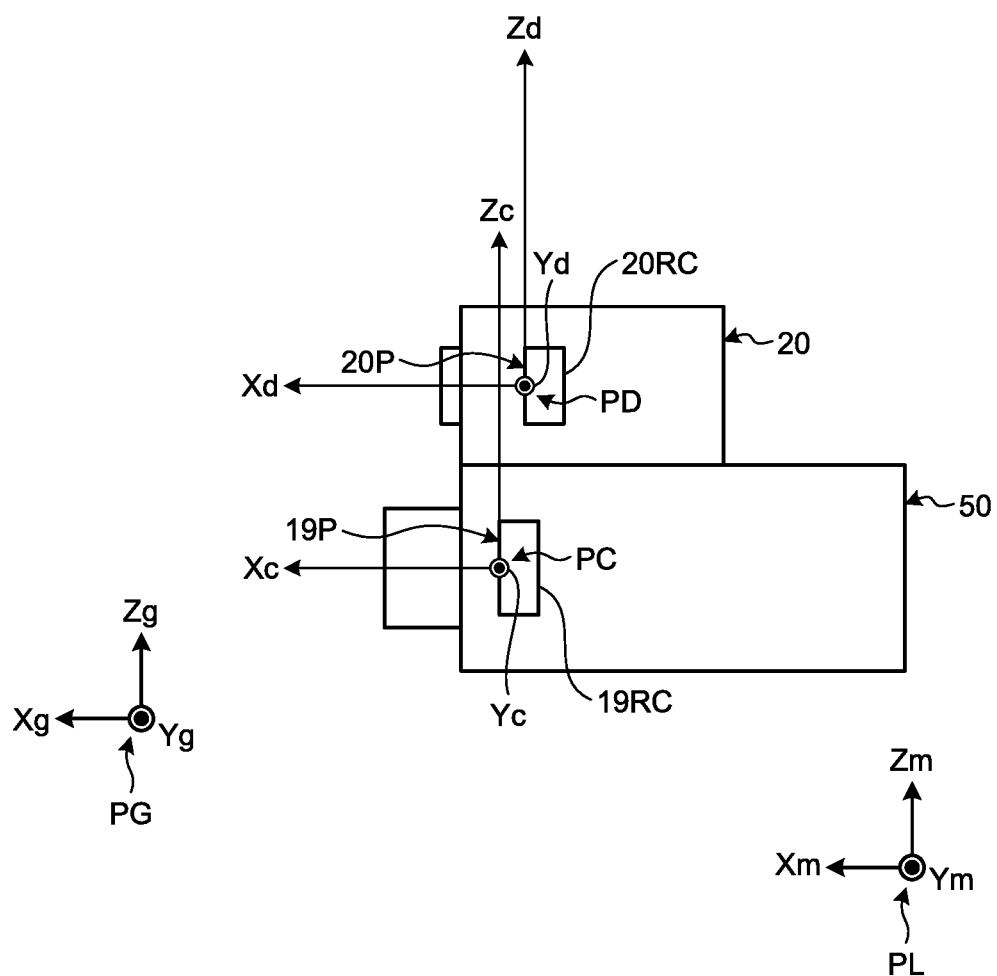
FIG. 8 is a view schematically illustrating a distance detection device and an imaging device according to the present embodiment.

FIG. 8 is a view schematically illustrating the distance detection device 20 and the imaging device 50 according to the present embodiment. As described above, the global coordinate system (Xg-Yg-Zg coordinate system) and the vehicle body coordinate system (Xm-Ym-Zm coordinate system) are defined in the present embodiment.

Furthermore, a distance detection device coordinate system (Xd-Yd-Zd coordinate system) and an imaging device coordinate system (Xc-Yc-Zc coordinate system) are defined in the present embodiment.

The distance detection device coordinate system is a three-dimensional coordinate system that indicates a relative position with respect to an origin PD defined in the distance detection device 20. The distance detection device coordinate system is defined by an Xd axis of a second reference plane with respect to the origin PD, a Yd axis orthogonal to the Xd axis in the second reference plane, and a Zd axis orthogonal to the second reference plane. The origin PD of the distance detection device coordinate system is defined at a center of a detection surface 20P of a distance detection element 20RC.

The imaging device coordinate system is a three-dimensional coordinate system that indicates a relative position with respect to an origin PC defined in the imaging device 50. The imaging device coordinate system is defined by an Xc axis of a third reference plane with respect to the origin PC, a Yc axis orthogonal to the Xc axis in the third reference plane, and a Zc axis orthogonal to the third reference plane. The origin PC of the imaging device coordinate system is defined at the center of an imaging surface 19P of an image sensor 19RC. The Xc axis passes through the optical center of the imaging device 50 and is orthogonal to the imaging surface 19P.

The relative position between the position Pa of the swing body 3 in the global coordinate system detected by the position detection device 30 and the origin PL in the vehicle body coordinate system of the swing body 3 is known data derived from design data, specification data, etc. of the excavator 1, for example. The relative position between the origin PL in the vehicle body coordinate system of the swing body 3, the origin PD in the distance detection device coordinate system, and the origin PC in the imaging device coordinate system is known data derived from design data of the excavator 1, design data or specification data of the distance detection device 20, design data or specification data of the imaging device 50, or the like. Therefore, the position Pa of the swing body 3 in the global coordinate system, the position in the vehicle body coordinate system of the swing body 3, the position in the distance detection device coordinate system, and the position in the imaging device coordinate system can be mutually transformed.

The relative position between the position Pb of the vehicle body 402 in the global coordinate system detected by the position detection device 430 and the origin PN in the vehicle body coordinate system of the vehicle body 402 is known data derived from design data or specification data of the transport vehicle WAb, for example. The relative position between the swing body 3 and the vehicle body 402 in the global coordinate system is defined by the position Pa of the swing body 3 detected by the position detection device 30 and the position Pb of the vehicle body 402 detected by the position detection device 430. Therefore, the position of the swing body 3 in the global coordinate system, the position Pb of the vehicle body 402 in the global coordinate system, the position in the vehicle body coordinate system of the swing body 3, and the position Pb in the vehicle body coordinate system of the vehicle body 402 can be mutually transformed. Furthermore, the position of the vehicle body 402 in the global coordinate system, the position of the vehicle body 402 in the vehicle body coordinate system, the position in the distance detection device coordinate system, and the position in the imaging device coordinate system can be mutually transformed.

[Distance Detection Device and Imaging Device]

Figure 9:
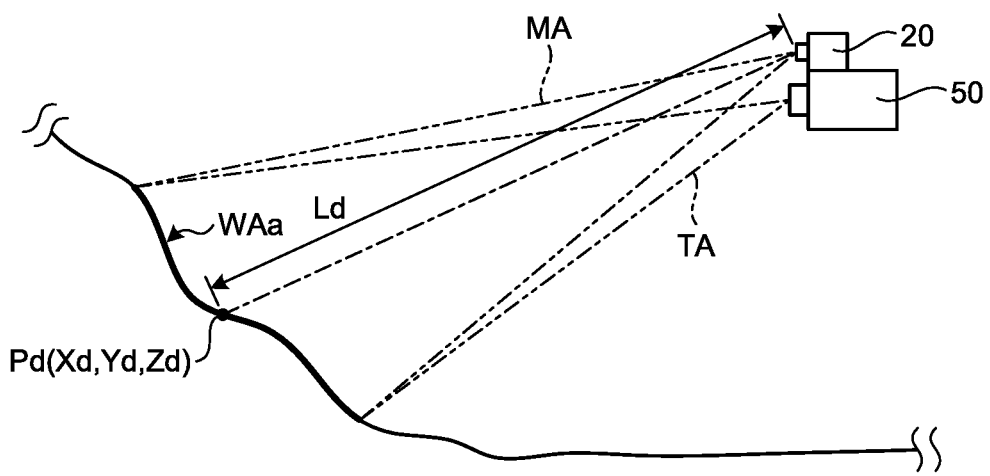
FIG. 9 is a view schematically illustrating an example of operation of the distance detection device and the imaging device according to the present embodiment.

FIG. 9 is a view schematically illustrating an example of the distance detection device 20 and the imaging device 50 according to the present embodiment. FIG. 9 illustrates an example in which the target WAa detected by the distance detection device 20 and imaged by the imaging device 50 is a ground surface of a construction target.

As illustrated in FIG. 9, the distance detection device 20 has a detection range MA. The distance detection device 20 detects the distance Ld to the target WAa present in the detection range MA. The distance Ld is a distance between the origin PD and the surface of the target WAa in the distance detection device coordinate system.

The distance detection device 20 detects the distance Ld from the surface of the target WAa, and detects a position Pd of the surface of the target WAa in the distance detection device coordinate system. The position Pd defines the orientation and angle with respect to the origin PD. The distance detection device 20 can detect three-dimensional coordinates (Xd, Yd, Zd) of the position Pd in the distance detection device coordinate system.

The distance detection device 20 detects the distance Ld from each of the plurality of portions on a surface of the target WAa, and then detects the position Pd of each of the plurality of portions, making it possible to detect the three-dimensional shape of the target WAa in the distance detection coordinate system. The three-dimensional shape of the target WAa is point cloud data of a plurality of positions Pd at which three-dimensional coordinates (Xd, Yd, Zd) have been detected.

The distance detection device 20 detects the three-dimensional shape of the target WAa in the forward direction of the swing body 3. In a case where the target WAa is a ground surface, the distance detection device 20 can detect the distance Ld from each of the plurality of portions on the ground surface, and can detect terrain of the excavator 1 in the forward direction.

As described above, the position in the global coordinate system, the position in the vehicle body coordinate system of the swing body 3, the position in the vehicle body coordinate system of the vehicle body 402, the position in the distance detection device coordinate system, and the position in the imaging device coordinate system can be mutually transformed. Therefore, the point group data of the plurality of positions Pd (Xd, Yd, Zd) defined in the distance detection device coordinate system can be transformed into point cloud data of a plurality of positions Pm (Xm, Ym, Zm) defined in the vehicle body coordinate system of the swing body 3, can be transformed into point cloud data of a plurality of positions Pn (Xn, Yn, Zn) defined in the vehicle body coordinate system of the vehicle body 402, can be transformed into point cloud data of point cloud data of a plurality of positions Pg (Xg, Yg, Zg) defined in the global coordinate system, and can be transformed into point cloud data of a plurality of positions Pc (Xc, Yc, Zc) defined in the imaging device coordinate system. In other words, the three-dimensional shape of the target WAa defined in the distance detection device coordinate system can be transformed, by coordinate transformation, into the three-dimensional shape of the target WAa of each of the vehicle body coordinate system of the swing body 3, the vehicle body coordinate system of the vehicle body 402, the global coordinate system, and the imaging device coordinate system.

The imaging device 50 has an imaging range TA. The imaging device 50 can obtain an image of the target WAa present in the imaging range TA. The detection range MA and the imaging range TA at least partially overlap with each other on a surface of the target WAa. The installation state of the distance detection device 20 and the installation state of the imaging device 50 with respect to the swing body 3 are adjusted such that the detection range MA and the imaging range TA at least partially overlap with each other. The overlapping range of the detection range MA and the imaging range TA is preferably as large as possible. The imaging device 50 obtains an image corresponding to each of the plurality of positions Pd. The position Pc in the image corresponding to the position Pd is defined in the imaging device coordinate system. By transforming the position Pd in the three-dimensional shape of the target WAa detected by the distance detection device 20 into the position Pc in the image of the imaging device coordinate system, it is possible to allow the three-dimensional shape of the target WAa and the image of the target WAa to overlap with each other in the imaging device coordinate system. Furthermore, the position Pd in the three-dimensional shape of the target WAa and the position Pc in the image of the target WAa can be transformed into the position Pm in the vehicle body coordinate system of the swing body 3, the position Pn in the vehicle body coordinate system of the vehicle body 402, or the position Pg in the global coordinate system.

[Control Device]

Figure 10:
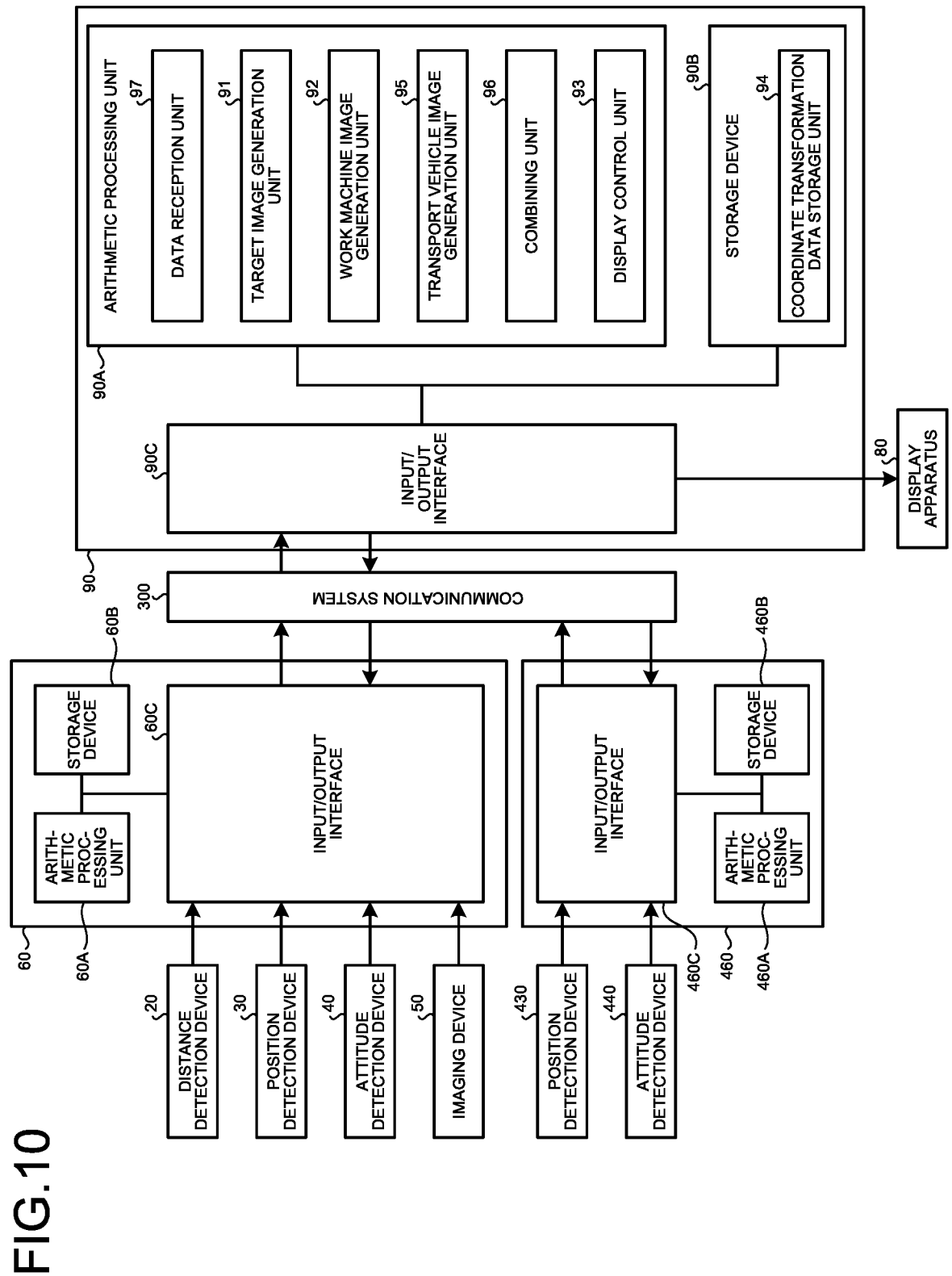
FIG. 10 is a functional block diagram illustrating an example of a control device according to the present embodiment.

FIG. 10 is a functional block diagram illustrating an example of the control device 60, the control device 460, and the control device 90 according to the present embodiment.

The control device 60 includes a computer system. The control device 60 includes: an arithmetic processing unit 60A including a processor such as a central processing unit (CPU); a storage device 60B including a volatile memory such as a random access memory (RAM), and a non-volatile memory such as a read only memory (ROM); and an input/output interface 60C including an input/output circuit capable of transmitting and receiving signals and data.

The control device 460 includes a computer system. The control device 460 includes: an arithmetic processing unit 460A including a processor such as a central processing unit (CPU); a storage device 460B including a volatile memory such as a random access memory (RAM), and a non-volatile memory such as a read only memory (ROM); and an input/output interface 460C including an input/output circuit capable of transmitting and receiving signals and data.

The control device 90 includes a computer system. The control device 90 includes: an arithmetic processing unit 90A including a processor such as a central processing unit (CPU); a storage device 90B including a volatile memory such as a random access memory (RAM), and a non-volatile memory such as a read only memory (ROM); and an input/output interface 90C.

The display apparatus 80 includes a flat panel display such as a liquid crystal display (LCD) or an organic electroluminescence display (OELD).

Detection data indicating the distance Ld to the target WAa detected by the distance detection device 20 is output to the control device 60 at a predetermined period. The input/output interface 60C of the control device 60 receives detection data of the distance detection device 20. The input/output interface 60C of the control device 60 transmits detection data of the distance detection device 20 to the control device 90 at a predetermined period via the communication system 300.

Detection data indicating the position Pa of the swing body 3 detected by the position detection device 30 is output to the control device 60 at a predetermined period. The input/output interface 60C of the control device 60 receives detection data of the position detection device 30. The input/output interface 60C of the control device 60 transmits detection data of the position detection device 30 to the control device 90 at a predetermined period via the communication system 300.

Detection data indicating the attitude of the excavator 1 detected by the attitude detection device 40 is output to the control device 60 at a predetermined period. The input/output interface 60C of the control device 60 receives detection data of the attitude detection device 40. The input/output interface 60C of the control device 60 transmits detection data of the attitude detection device 40 to the control device 90 at a predetermined period via the communication system 300.

Image data of the target WAa captured by the imaging device 50 is output to the control device 60 at a predetermined period. The input/output interface 60C of the control device 60 receives the image data of the imaging device 50. The input/output interface 60C of the control device 60 transmits the image data of the target WAa to the control device 90 at a predetermined period via the communication system 300.

Detection data indicating the position Pb of the vehicle body 402 detected by the position detection device 430 is output to the control device 460 at a predetermined period. The input/output interface 460C of the control device 460 receives detection data of the position detection device 430. The input/output interface 460C of the control device 460 transmits detection data of the position detection device 430 to the control device 90 at a predetermined period via the communication system 300.

Detection data indicating the attitude of the transport vehicle WAb detected by the attitude detection device 440 is output to the control device 460 at a predetermined period. The input/output interface 460C of the control device 460 receives detection data of the attitude detection device 440. The input/output interface 460C of the control device 460 transmits detection data of the attitude detection device 440 to the control device 90 at a predetermined period via the communication system 300.

The control device 90 receives detection data of the distance detection device 20, detection data of the position detection device 30, detection data of the attitude detection device 40, image data of the target WAa captured by the imaging device 50, detection data of the position detection device 430, and detection data of the attitude detection device 440 via the communication system 300 at a predetermined period. On the basis of detection data of the distance detection device 20, the control device 90 generates, at a predetermined period, a target image AGa representing a virtual viewpoint image of the target WAa viewed from a virtual viewpoint outside the excavator 1. Furthermore, on the basis of the detection data of the position detection device 30 and the detection data of the attitude detection device 40, the control device 90 generates, at a predetermined period, a work machine image BG representing a virtual viewpoint image of the excavator 1 viewed from a virtual viewpoint outside the excavator 1. Furthermore, on the basis of the detection data of the position detection device 430 and the detection data of the attitude detection device 440, the control device 90 generates, at a predetermined period, a transport vehicle image AGb representing a virtual viewpoint image of the transport vehicle WAb viewed from a virtual viewpoint outside the excavator 1 and the transport vehicle WAb. Furthermore, the control device 90 generates, at a predetermined period, a combined image IG in which the target image AGa, the work machine image BG, and the transport vehicle image AGb are superimposed.

The display apparatus 80 displays the combined image IG generated by the control device 90. The combined image IG including the target image AGa, the work machine image BG, and the transport vehicle image AGb is a computer graphic image generated by the control device 90. Each of the target image AGa, the work machine image BG, and the transport vehicle image AGb displayed on the display apparatus 80 is a three-dimensional bird's eye image viewed from a virtual viewpoint outside the excavator 1 and the transport vehicle WAb. The display apparatus 80 also displays a real image RG representing an actual image of the target WAa at the work site captured by the imaging device 50. The real image RG is a two-dimensional image.

The virtual viewpoint represents a viewpoint virtually set in a virtual space simulating a real space (in the present embodiment, a work site). The position and orientation of the virtual viewpoint can be set arbitrarily. The virtual viewpoint image refers to a virtual bird's eye image viewed from a virtual viewpoint to which position and orientation have been set in a virtual space. For example, a virtual viewpoint image refers to a virtual image captured at imaging a virtual space using an imaging device that is installed at a virtual viewpoint and to which position and orientation have been set in the virtual space. The virtual viewpoint image is a computer graphic image generated by the control device 90.

In the present embodiment, the position of the virtual viewpoint is set outside the excavator 1 and the transport vehicle WAb and diagonally upward of the excavator 1 and the transport vehicle WAb. The orientation of the virtual viewpoint is set diagonally downward so as to look down on the excavator 1, the target WAa around the excavator 1, and the transport vehicle WAb. The target image AGa is a virtual three-dimensional bird's eye image of the target WAa viewed from the virtual viewpoint in the virtual space of the work site. The work machine image BG is a virtual three-dimensional bird's eye image of the excavator 1 viewed from a virtual viewpoint in the virtual space of the work site. The transport vehicle image AGb is a virtual three-dimensional bird's eye image of the transport vehicle WAb viewed from the virtual viewpoint in the virtual space of the work site.

The arithmetic processing unit 90A includes a data reception unit 97, a target image generation unit 91, a work machine image generation unit 92, a transport vehicle image generation unit 95, a combining unit 96, and a display control unit 93. The storage device 90B includes a coordinate transformation data storage unit 94.

The data reception unit 97 receives detection data of the distance detection device 20, detection data of the position detection device 30, detection data of the attitude detection device 40, and image data of the imaging device 50, via the communication system 300. The data reception unit 97 further receives detection data of the position detection device 430 and detection data of the attitude detection device 440, via the communication system 300.

The target image generation unit 91 generates, at a predetermined period, a target image AGa indicating a virtual viewpoint image of the target WAa viewed from a virtual viewpoint outside the excavator 1 on the basis of detection data of the distance detection device 20. The detection data of the distance detection device 20 includes a three-dimensional shape of a surface of the target WAa. The target image AGa is a three-dimensional image of the target WAa viewed from a virtual viewpoint. The target image generation unit 91 generates the target image AGa being a three-dimensional image of the target WAa viewed from the virtual viewpoint, on the basis of the three-dimensional shape of the target WAa.

In the present embodiment, the target image generation unit 91 generates, at a predetermined period, the target image AGa defined by the distance detection device coordinate system. In a case where the target image AGa is a construction target (terrain), the three-dimensional shape of the target WAa changes at the work site due to excavation work, ground leveling work, or the like. The target image generation unit 91 generates the target image AGa at a predetermined period. In a case where the three-dimensional shape of the target WAa has changed due to excavation work, ground leveling work, or the like, the target image generation unit 91 generates a target image AGa interlocking with the change of the three-dimensional shape of the target WAa.

On the basis of the detection data of the position detection device 30 and the detection data of the attitude detection device 40, the work machine image generation unit 92 generates, at a predetermined period, a work machine image BG representing a virtual viewpoint image of the excavator 1 viewed from a virtual viewpoint outside the excavator 1. Detection data of the attitude detection device 40 includes attitude of the swing body 3 of the excavator 1 and attitude of the working equipment 4. The work machine image BG is a three-dimensional image of the excavator 1 viewed from a virtual viewpoint. On the basis of the attitude of the swing body 3 and the attitude of the working equipment 4, the work machine image generation unit 92 generates, at a predetermined period, a work machine image BG being a three-dimensional image of the excavator 1 viewed from a virtual viewpoint.

In the present embodiment, the work machine image generation unit 92 generates, at a predetermined period, the work machine image BG defined by the vehicle body coordinate system of the swing body 3. Furthermore, when the swing body 3 has swiveled and the yaw angle θ3 has changed, for example, the work machine image generation unit 92 generates the work machine image BG at a predetermined period so as to interlock with the swivel of the swing body 3. Similarly, when at least one of the roll angle θ1 and the pitch angle θ2 has changed, the work machine image generation unit 92 generates, at a predetermined period, the work machine image BG so as to interlock with the change in at least one of the roll angle θ1 and the pitch angle θ2. Furthermore, when at least one of the inclination angles α, β, and γ has changed by activation of the working equipment 4, the work machine image generation unit 92 generates, at a predetermined period, the work machine image BG so as to interlock with the change in at least one of the inclination angles α, β, and γ.

On the basis of the detection data of the position detection device 430 and the detection data of the attitude detection device 440, the transport vehicle image generation unit 95 generates, at a predetermined period, a transport vehicle image AGb representing a virtual viewpoint image of the transport vehicle WAb viewed from a virtual viewpoint outside the excavator 1 and the transport vehicle WAb. The transport vehicle image AGb is a three-dimensional image of the transport vehicle WAb viewed from a virtual viewpoint. The transport vehicle image generation unit 95 generates, at a predetermined period, a transport vehicle image AGb being a three-dimensional image of the transport vehicle WAb viewed from the virtual viewpoint, on the basis of the attitude of the transport vehicle WAb.

In the present embodiment, the transport vehicle image generation unit 95 generates, at a predetermined period, a transport vehicle image AGb defined by the vehicle body coordinate system of the vehicle body 402. Furthermore, when the transport vehicle WAb has swiveled and the yaw angle θ6 has changed, for example, the transport vehicle image generation unit 95 generates the transport vehicle image AGb at a predetermined period so as to interlock with the swivel of the vehicle body 402. Similarly, when at least one of the roll angle θ4 and the pitch angle θ5 has changed, the transport vehicle image generation unit 95 generates the transport vehicle image AGb at a predetermined period so as to interlock with the change in at least one of the roll angle θ4 and the pitch angle θ5. In addition, when the three-dimensional shape or position of the transport vehicle WAb has changed due to loading work, transport work, or the like, the transport vehicle image generation unit 95 generates the transport vehicle image AGb so as to interlock with the change in the three-dimensional shape or position of the transport vehicle WAb.

The combining unit 96 combines the work machine image BG generated by the work machine image generation unit 92 and the transport vehicle image AGb generated by the transport vehicle image generation unit 95 to generate a combined image 1G. The combining unit 96 generates the combined image IG at a predetermined period. The combined image IG is an image in which the work machine image BG and the transport vehicle image AGb are superimposed.

In the present embodiment, the combining unit 96 combines the target image AGa generated by the target image generation unit 91, the work machine image BG generated by the work machine image generation unit 92, and the transport vehicle image AGb generated by the transport vehicle image generation unit 95. The combined image IG is an image in which the target image AGa, the work machine image BG, and the transport vehicle image AGb are superimposed. Note that the target image AGa need not be included in the combined image IG.

The display control unit 93 causes the combined image IG to be displayed on the display apparatus 80. The display control unit 93 obtains, from the combining unit 96, the combined image IG generated by the combining unit 96. The display control unit 93 transforms the combined image IG into display data that can be displayed by the display apparatus 80, and outputs the display data to the display apparatus 80. With this operation, the combined image IG is displayed on the display apparatus 80.

The coordinate transformation data storage unit 94 stores coordinate transformation data for mutually transforming the position in the global coordinate system, the position in the vehicle body coordinate system of the swing body 3, the position in the vehicle body coordinate system of the vehicle body 402, the position in the distance detection device coordinate system, and the position in the imaging device coordinate system. Coordinate transformation data includes coordinate transformation parameters or coordinate transformation determinants. The relative positions between the position Pa of the swing body 3 in the global coordinate system, the position Pb of the vehicle body 402 in the global coordinate system, the origin PL in the vehicle body coordinate system of the swing body 3, the origin PN in the vehicle body coordinate system of the vehicle body 402, the origin PD in the distance detection device coordinate system, and the origin PC in the imaging device coordinate system are known data derived from design data, specification data, or the like. Accordingly, coordinate transformation data can be preliminarily derived on the basis of known data. The coordinate transformation data storage unit 94 stores preliminarily derived coordinate transformation data.

On the basis of the coordinate transformation data stored in the coordinate transformation data storage unit 94, the combining unit 96 performs coordinate transformation on at least one of the target image AGa, the work machine image BG, and the transport vehicle image AGb so as to allow the combined image IG to be displayed on the display apparatus 80 in a predetermined single coordinate system. The display control unit 93 causes the combined image IG to be displayed on the display apparatus 80 in a single coordinate system.

The target image generation unit 91 can generate the target image AGa in the distance detection device coordinate system on the basis of the detection data of the distance detection device 20. The work machine image generation unit 92 can generate the work machine image BG in the vehicle body coordinate system of the swing body 3 on the basis of the detection data of the attitude detection device 40. Furthermore, the work machine image generation unit 92 can generate the work machine image BG in the global coordinate system on the basis of the detection data of the position detection device 30 and the detection data of the attitude detection device 40. The transport vehicle image generation unit 95 can generate the transport vehicle image AGb in the vehicle body coordinate system of the vehicle body 402 on the basis of the detection data of the attitude detection device 440. Transport vehicle image generation unit 95 can generate the transport vehicle image AGb in the global coordinate system on the basis of detection data of position detection device 430 and detection data of attitude detection device 440. The combining unit 96 adjusts at least one of the coordinate system of the target image AGa, the coordinate system of the work machine image BG, and the coordinate system of the transport vehicle image AGb so as to allow the target image AGa, the work machine image BG, and the transport vehicle image AGb to be displayed in a single coordinate system.

For example, in a case where the target image AGa, the work machine image BG, and the transport vehicle image AGb defined in the vehicle body coordinate system of the swing body 3 are caused to be displayed on the display apparatus 80, the combining unit 96 transforms the target image AGa defined in the distance detection coordinate system into the target image AGa defined in the vehicle body coordinate system of the swing body 3 on the basis of the coordinate transformation data stored in the coordinate transformation data storage unit 94. Furthermore, the combining unit 96 transforms the transport vehicle image AGb defined in the vehicle body coordinate system of the vehicle body 402 or the global coordinate system into the transport vehicle image AGb defined in the vehicle body coordinate system of the swing body 3 on the basis of the coordinate transformation data stored in the coordinate transformation data storage unit 94. With this operation, the target image AGa, the work machine image BG, and the transport vehicle image AGb are defined in the vehicle body coordinate system of the swing body 3. The display control unit 93 causes the combined image IG including the target image AGa, the work machine image BG, and the transport vehicle image AGb defined in the vehicle body coordinate system of the swing body 3, to be displayed on the display apparatus 80.

Furthermore, for example, in a case where the target image AGa, the work machine image BG, and the transport vehicle image AGb defined in the global coordinate system are caused to be displayed on the display apparatus 80, the combining unit 96 transforms the target image AGa defined in the distance detection coordinate system into the target image AGa defined in the global coordinate system, transforms the work machine image BG defined in the vehicle body coordinate system of the swing body 3 into the work machine image BG defined in the global coordinate system, and transforms the transport vehicle image AGb defined in the vehicle body coordinate system of the vehicle body 402 into the transport vehicle image AGb defined in the global coordinate system, on the basis of the coordinate transformation data stored in the coordinate transformation data storage unit 94. With this operation, the target image AGa, the work machine image BG, and the transport vehicle image AGb are defined in the global coordinate system. The display control unit 93 causes the combined image IG including the target image AGa, the work machine image BG, and the transport vehicle image AGb defined in the global coordinate system, to be displayed on the display apparatus 80.

In the present embodiment, the display control unit 93 causes the combined image IG including the real image RG being an actual image of the target WAa captured by the imaging device 50, the target image AGa, the work machine image BG, and the transport vehicle image AGb, to be simultaneously displayed on the display apparatus 80. In the present embodiment, the display control unit 93 causes the combined image IG to be displayed on a part of the display screen on which the real image RG is to be displayed.

Figure 11:
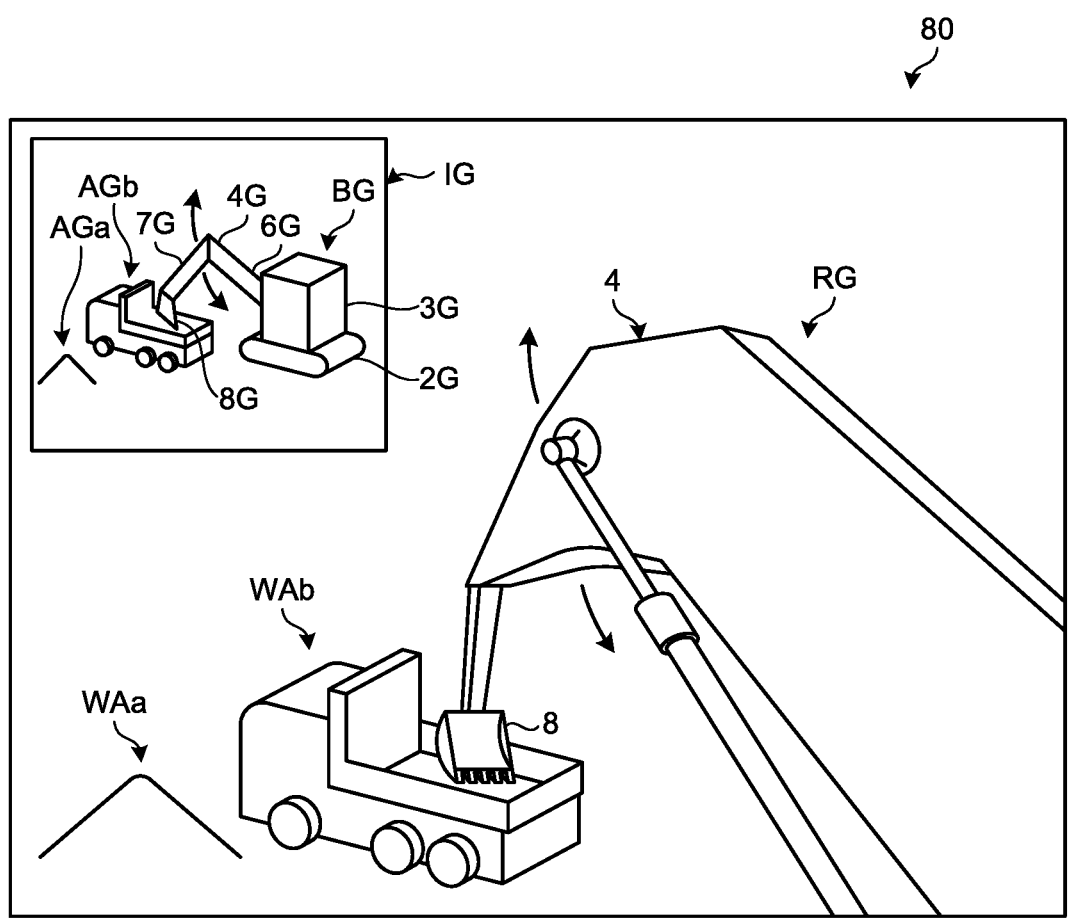
FIG. 11 is a view illustrating a display example of a display apparatus according to the present embodiment.

FIG. 11 is a view illustrating a display example of the display apparatus 80 according to the present embodiment. The imaging device 50 obtains the real image RG being an actual image of the target WAa in the forward direction of the swing body 3. The display control unit 93 causes the real image RG of the work site obtained by the imaging device 50, to be displayed on the display screen of the display apparatus 80.

The imaging device 50 obtains the real image RG of the target WAa in the forward direction of the swing body 3. At the time of imaging by the imaging device 50, at least a part of the working equipment 4 is captured. The real image RG obtained by the imaging device 50 includes a real image of the working equipment 4. In the present embodiment, the display screen of the display apparatus 80 that displays the real image RG of the work site includes the real image of the working equipment 4. The real image of the working equipment 4 is displayed on the display screen of the display apparatus 80 that displays the real image RG of the work site imaged by the imaging device 50.

The display control unit 93 causes the combined image IG including the target image AGa, the work machine image BG, and the transport vehicle image AGb, to be simultaneously displayed on a part of the display screen of the display apparatus 80 that displays the real image RG of the work site captured by the imaging device 50. That is, the display control unit 93 causes the target image AGa, the work machine image BG, and the transport vehicle image AGb to be superimposed on a part of the display screen of the display apparatus 80 that displays the real image RG of the work site. Hereinafter, the combined image IG including at least the work machine image BG and the transport vehicle image AGb to be superimposed on a part of the display screen of the display apparatus 80 will be appropriately referred to as a superimposition image IG. In the present embodiment, the superimposition image IG includes not only the work machine image BG and the transport vehicle image AGb but also the target image AGa.

In the superimposition image IG, the target image AGa, the work machine image BG, and the transport vehicle image AGb are displayed in superimposed states.

In the present embodiment, the display control unit 93 causes the real image of the working equipment 4 and the superimposition image IG including the work machine image BG and the transport vehicle image Agb to be displayed at mutually different positions on the display screen. As illustrated in FIG. 11, in the present embodiment, the real image of the working equipment 4 is displayed on the central portion and the right portion of the display screen of the display apparatus 80. The display control unit 93 causes the superimposition image IG to be displayed on the corner of the display screen of the display apparatus 80 so as to avoid overlapping of the real image of the working equipment 4 and the superimposition image IG. In the present embodiment, the display screen of the display apparatus 80 displays not only the real image of the working equipment 4 but also the real image of the ground surface, which is the construction target of the working equipment 4. Accordingly, the display control unit 93 causes the superimposition image IG to be displayed on the upper left corner of the display screen of the display apparatus 80 so as to avoid overlapping of the real image of the working equipment 4 and the real image of the ground surface, with the superimposition image IG. The superimposition image IG may be displayed in the upper right corner of the display screen of the display apparatus 80. Since the real image of the working equipment 4 and the real image of the construction target are not hidden by the superimposition image IG, the operator can smoothly perform the work of constructing the construction target using the working equipment 4 while watching the real image.

The virtual viewpoint is set diagonally upward of the excavator 1 and the target WAa around the excavator 1. In the present embodiment, the ground surface being a construction target exists as the target WAa. That is, in the present embodiment, the target image AGa is a three-dimensional bird's eye image indicating a three-dimensional shape of the ground surface WAa being a construction target viewed from a virtual viewpoint.

For example, together with the progress of work such as excavation work or ground leveling work by the excavator 1, the shape of the ground surface being the target WAa also changes. The shape of the target image AGa also changes together with the change in the shape of the ground surface. In a case where the shape of the ground surface being the target WAa changes due to excavation work or ground leveling work, or the like, the display control unit 93 causes the target image AGa interlocking with the change in the shape of the ground surface to be displayed on the display apparatus 80 on the basis of detection data of the distance detection device 20.

In the present embodiment, the work machine image BG is a bird's eye skeleton image that schematically simulates the excavator 1 viewed from a virtual viewpoint. In accordance with the movement of the excavator 1 and the change of the attitude of the excavator 1, the work machine image BG moves in real time. That is, the work machine image BG moves in synchronization with the change in the position and attitude of the excavator 1. When the display control unit 93 has detected that the excavator 1 (carriage 2) is moving on the basis of the detection data of the position detection device 30, the display control unit 93 moves the work machine image BG so as to interlock with the change in the position of the excavator 1. The work machine image BG includes a carriage image 2G being a virtual viewpoint image that simulates the carriage 2, a swing body image 3G being a virtual viewpoint image that simulates the swing body 3, and a working equipment image 4G being virtual viewpoint image that simulates the working equipment 4. The working equipment image 4G includes a boom image 6G that simulates the boom 6, an arm image 7G that simulates the arm 7, and a bucket image 8G that simulates the bucket 8.

The carriage image 2G includes a skeleton image that schematically indicates an outer shape of the carriage 2. The swing body image 3G includes a skeleton image that schematically indicates an outer shape of the swing body 3. The working equipment image 4G includes a skeleton image that schematically indicates an outer shape of working equipment 4. The work machine image BG including the carriage image 2G, the swing body image 3G, and the working equipment image 4G are three-dimensional computer graphic images. The work machine image generation unit 92 obtains from the storage device 90B a skeleton image (three-dimensional CG model) stored in the storage device 90B, and generates the work machine image BG that moves in synchronization with the change in position and attitude of the excavator 1, on the basis of the detection data of the position detection device 30 and the detection data of the attitude detection device 40.

For example, when the excavator 1 moves, the position detection device 30 transmits detection data indicating that the excavator 1 has moved to the control device 90, at a predetermined period. The work machine image generation unit 92 moves the work machine image BG so as to interlock with the movement of the excavator 1. The display control unit 93 causes the work machine image BG to be displayed on the display apparatus 80 such that the work machine image BG (carriage image 2G) moves.

In addition, when there is an attitude change in the excavator 1, the display control unit 93 moves the work machine image BG so as to interlock with the change in the attitude of the excavator 1 on the basis of the detection data of the attitude detection device 40. When the swing body 3 of the excavator 1 swivels, the swing body attitude sensor 41 transmits detection data indicating that the swing body 3 has swiveled to the control device 90 at a predetermined period. The work machine image generation unit 92 swivels the swing body image 3G of the work machine image BG so as to interlock with the swivel of the swing body 3 of the excavator 1. The display control unit 93 causes the work machine image BG to be displayed on the display apparatus 80 such that the swing body image 3G swivels. When the working equipment 4 of the excavator 1 is activated, the working equipment attitude sensor 42 transmits detection data indicating activation of the working equipment 4, to the control device 90. The work machine image generation unit 92 activates the working equipment image 4G of the work machine image BG so as to be interlocked with the activation of the working equipment 4 of the excavator 1. The display control unit 93 causes the work machine image BG to be displayed on the display apparatus 80 such that the working equipment image 4G is activated. For example, the display control unit 93 moves the boom image 6G to interlock with the change of the inclination angle $\alpha$, moves the arm image 7G to interlock with the change of the inclination angle $\beta$, and moves the bucket image 8G to interlock with the change of the inclination angle $\gamma$.

In the present embodiment, the transport vehicle image AGb is a bird's eye skeleton image that schematically simulates the transport vehicle WAb viewed from the virtual viewpoint. The transport vehicle image AGb moves in real time together with the movement of the transport vehicle WAb and the change of the attitude of the transport vehicle WAb. That is, the transport vehicle image AGb moves in synchronization with the changes in the position and attitude of the transport vehicle WAb. When the display control unit 93 has detected the movement of the transport vehicle WAb on the basis of the detection data of the position detection device 430, the display control unit 93 moves the transport vehicle image AGb so as to interlock with the change in the position of the transport vehicle WAb. When the transport vehicle WAb moves, the position detection device 430 transmits detection data indicating movement of the transport vehicle WAb, to the control device 90. The transport vehicle image generation unit 95 moves the transport vehicle image AGb so as to interlock with the movement of the transport vehicle WAb. The display control unit 93 causes the transport vehicle image AGb to be displayed on the display apparatus 80 such that the transport vehicle image AGb moves.

The transport vehicle image AGb includes a skeleton image that schematically indicates an outer shape of transport vehicle WAb. The transport vehicle image AGb is a three-dimensional computer graphic image. The transport vehicle image generation unit 95 obtains from the storage device 90B a skeleton image (three-dimensional CG model) stored in the storage device 90B, and generates the transport vehicle image AGb that moves in synchronization with the change in position and attitude of the excavator 1, on the basis of the detection data of the position detection device 430 and the detection data of the attitude detection device 440.

Furthermore, when there is an attitude change in the transport vehicle WAb, the display control unit 93 moves the transport vehicle image AGb on the basis of the detection data of the attitude detection device 440 so as to interlock with the change in the attitude of the transport vehicle WAb. When the transport vehicle WAb inclines or swivels, the attitude detection device 440 transmits detection data indicating the inclination or swivel of the transport vehicle WAb, to the control device 90. The transport vehicle image generation unit 95 allows the transport vehicle image AGb to incline or swivel so as to interlock with the inclination or swivel of the transport vehicle WAb. The display control unit 93 causes the transport vehicle image AGb to be displayed on the display apparatus 80 such that the transport vehicle image AGb is inclined or swiveled.

In addition, the shape of the transport vehicle WAb changes together with the change in the amount of cargo loaded onto the loading platform of the transport vehicle WAb. The distance detection device 20 can detect the shape of the transport vehicle WAb. When there is a change in the shape of the transport vehicle WAb, the display control unit 93 may change the shape or display mode of the transport vehicle image AGb being a character image so as to interlock with the change in the shape of the transport vehicle WAb on the basis of detection data of the distance detection device 20.

[Display Method]

Figure 12:
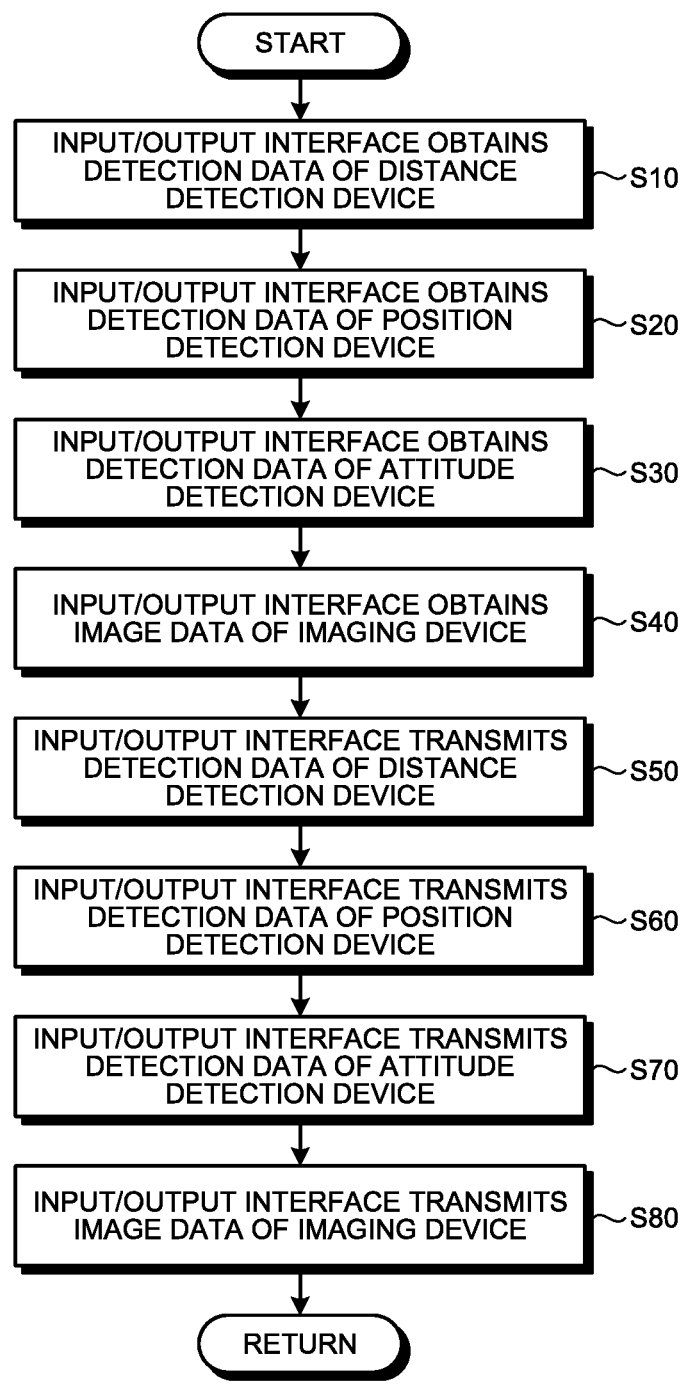
FIG. 12 is a flowchart illustrating an example of operation of a display method according to the present embodiment.
Figure 13:
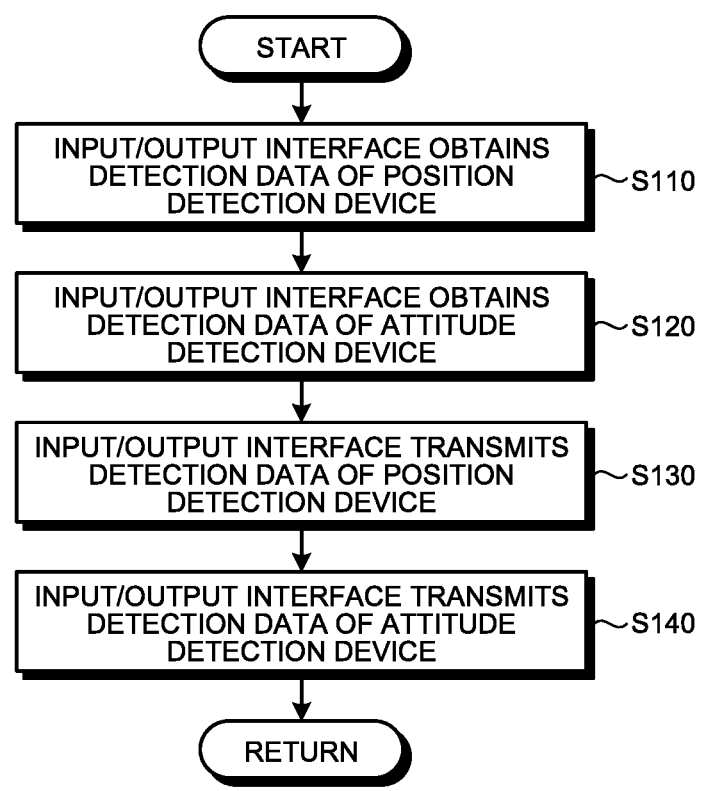
FIG. 13 is a flowchart illustrating an example of a display method according to the present embodiment.
Figure 14:
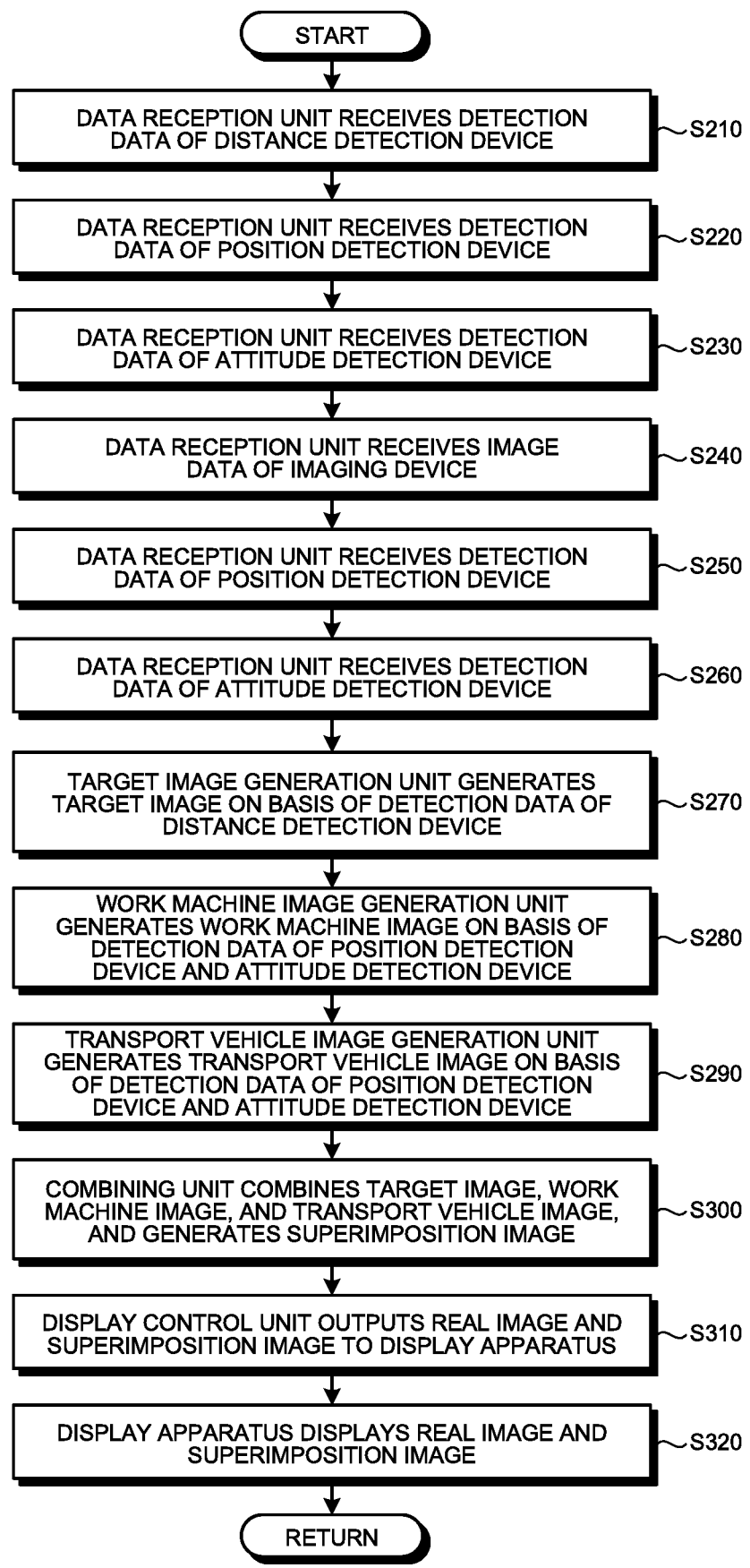
FIG. 14 is a flowchart illustrating an example of operation of a display method according to the present embodiment.

FIGS. 12, 13, and 14 are flowcharts illustrating an example of a display method according to the present embodiment. FIG. 12 is a flowchart illustrating processing of the control device 60 of the excavator 1. FIG. 13 is a flowchart illustrating processing of the control device 460 of the transport vehicle WAb. FIG. 14 is a flowchart illustrating processing of the control device 90 of the remote control system 100. The processing illustrated in FIGS. 12, 13, and 14 is performed at a predetermined period.

Processing of the control device 60 of the excavator 1 will be described with reference to FIG. 12.

The distance detection device 20 detects the distance Ld to the target WAa, and detects the three-dimensional shape of the target WAa.

The position detection device 30 detects the position Pa of the swing body 3.

The attitude detection device 40 detects attitude of the excavator 1 including the attitude of the swing body 3 and the attitude of the working equipment 4. The attitude of the swing body 3 includes the roll angle θ1, the pitch angle θ2, and the yaw angle θ3. The yaw angle θ3 changes with swivel movement of the swing body 3. In a case where the swing body 3 swivels while the carriage 2 is stopped, the yaw angle θ3 corresponds to a swivel angle of the swing body 3. The attitude of the working equipment 4 includes the inclination angle α, the inclination angle β, and the inclination angle γ.

Furthermore, the imaging device 50 obtains image data representing the real image RG of the work site.

Detection data of the distance detection device 20, detection data of the position detection device 30, detection data of the attitude detection device 40, and image data of the imaging device 50 are output to the control device 60.

The input/output interface 60C of the control device 60 obtains detection data of the distance detection device 20 from the distance detection device 20 (Step S10).

The input/output interface 60C of the control device 60 obtains detection data of the position detection device 30 from the position detection device 30 (Step S20).

The input/output interface 60C of the control device 60 obtains detection data of the attitude detection device 40 from the attitude detection device 40 (Step S30).

The input/output interface 60C of the control device 60 obtains the image data of the imaging device 50 from the imaging device 50 (Step S40).

Note that the execution order of Step S10, Step S20, Step S30, and Step S40 is arbitrary, and may be performed simultaneously.

The input/output interface 60C of the control device 60 transmits detection data of the distance detection device 20 to the control device 90 via the communication system 300 (Step S50).

The input/output interface 60C of the control device 60 transmits detection data of the position detection device 30 to the control device 90 via the communication system 300 (Step S60).

The input/output interface 60C of the control device 60 transmits the detection data of the attitude detection device 40 to the control device 90 via the communication system 300 (Step S70).

The input/output interface 60C of the control device 60 transmits the image data of the imaging device 50 to the control device 90 via the communication system 300 (Step S80).

Note that the execution order of Step S50, Step S60, Step S70, and Step S80 is arbitrary, and may be performed simultaneously.

Next, processing of the control device 460 of the transport vehicle WAb will be described with reference to FIG. 13.

The position detection device 430 detects the position Pb of the vehicle body 402. Detection data of the position detection device 430 is output to the control device 460.

The attitude detection device 440 detects the attitude of the vehicle body 402. The attitude of the vehicle body 402 includes the roll angle θ4, the pitch angle θ5, and the yaw angle θ6. Detection data of the attitude detection device 440 is output to the control device 460.

The input/output interface 460C of the control device 460 obtains detection data of the position detection device 430 from the position detection device 430 (Step S110).

The input/output interface 460C of the control device 460 obtains detection data of the attitude detection device 440 from the attitude detection device 440 (Step S120).

Note that the execution order of Step S110 and Step S120 is arbitrary, and may be performed simultaneously.

The input/output interface 460C of the control device 460 transmits the detection data of the position detection device 430 to the control device 90 via the communication system 300 (Step S130).

Furthermore, the input/output interface 460C of the control device 460 transmits detection data of the attitude detection device 440 to the control device 90 via the communication system 300 (Step S140).

Note that the execution order of Step S130 and Step S140 is arbitrary, and may be performed simultaneously.

Next, processing of the control device 90 of the remote control system 100 will be described with reference to FIG. 14.

The data reception unit 97 of the control device 90 receives the detection data of the distance detection device 20 via the communication system 300 (Step S210).

The data reception unit 97 of the control device 90 receives detection data of the position detection device 30 via the communication system 300 (Step S220).

The data reception unit 97 of the control device 90 receives the detection data of the attitude detection device 40 via the communication system 300 (Step S230).

The data reception unit 97 of the control device 90 receives the image data of the imaging device 50 via the communication system 300 (Step S240).

The data reception unit 97 of the control device 90 receives the detection data of the position detection device 430 via the communication system 300 (Step S250).

The data reception unit 97 of the control device 90 receives the detection data of the attitude detection device 440 via the communication system 300 (Step S260).

Note that the execution order of Step S210, Step S220, Step S230, Step S240, Step S250, and Step S260 is arbitrary, and may be performed simultaneously.

The target image generation unit 91 generates the target image AGa representing a virtual viewpoint image of the target WAa on the basis of the detection data of the distance detection device 20 (Step S270).

The work machine image generation unit 92 generates the work machine image BG representing a virtual viewpoint image of the excavator 1 on the basis of the detection data of the position detection device 30 and the detection data of the attitude detection device 40 (Step S280).

The transport vehicle image generation unit 95 generates the transport vehicle image AGb representing a virtual viewpoint image of the transport vehicle WAb on the basis of the detection data of the position detection device 430 and the detection data of the attitude detection device 440 (Step S290).

The combining unit 96 combines the target image AGa, the work machine image BG, and the transport vehicle image AGb to generate the superimposition image IG (Step S300).

The combining unit 96 generates the superimposition image IG in which the target image AGa, the work machine image BG, and the transport vehicle image AGb are superimposed. The combining unit 96 uses the coordinate transformation data stored in the coordinate transformation data storage unit 94 and adjusts the coordinate system of the target image AGa, the coordinate system of the work machine image BG, and the coordinate system of the transport vehicle image AGb such that the target image AGa, the work machine image BG, and the transport vehicle image AGb will be displayed in a single coordinate system.

The display control unit 93 outputs the real image RG of the target WAa captured by the imaging device 50 to the display apparatus 80. In addition, the display control unit 93 obtains, from the combining unit 96, the superimposition image IG generated by the combining unit 96. The display control unit 93 outputs the superimposition image IG including the target image AGa, the work machine image BG, and the transport vehicle image AGb defined in a single coordinate system, to the display apparatus 80 (Step S310).

The display apparatus 80 displays the real image RG of the target WAa including at least a real picture of the working equipment 4, and the superimposition image IG (Step S320). The display control unit 93 causes the real image of the working equipment 4 and the superimposition image IG to be displayed at different positions on the display screen of the display apparatus 80.

The operator operates the remote controller 70 to remotely control the excavator 1 while watching the real image RG and the superimposition image IG displayed on the display apparatus 80. Since the superimposition image IG is a three-dimensional bird's eye image of the target WAa, the transport vehicle WAb, and the excavator 1, the operator easily obtains perspective of the excavator 1 and the target WAa by viewing the superimposition image IG. In the present embodiment, since the target image AGa indicating the three-dimensional shape of the ground surface being the target WAa is displayed, the operator can grasp the distance between the target WAa and the working equipment 4 of the excavator 1 while viewing the target image AGa and the work machine image BG. This enables the operator to smoothly perform the excavation work or ground leveling work. Furthermore, since the transport vehicle image AGb indicating the three-dimensional shape of the transport vehicle WAb is displayed, the operator can grasp the distance between the transport vehicle WAb and the working equipment 4 of the excavator 1 while viewing the transport vehicle image AGb and the work machine image BG. This enables the operator to smoothly perform the loading work, or the like.

Figure 15:
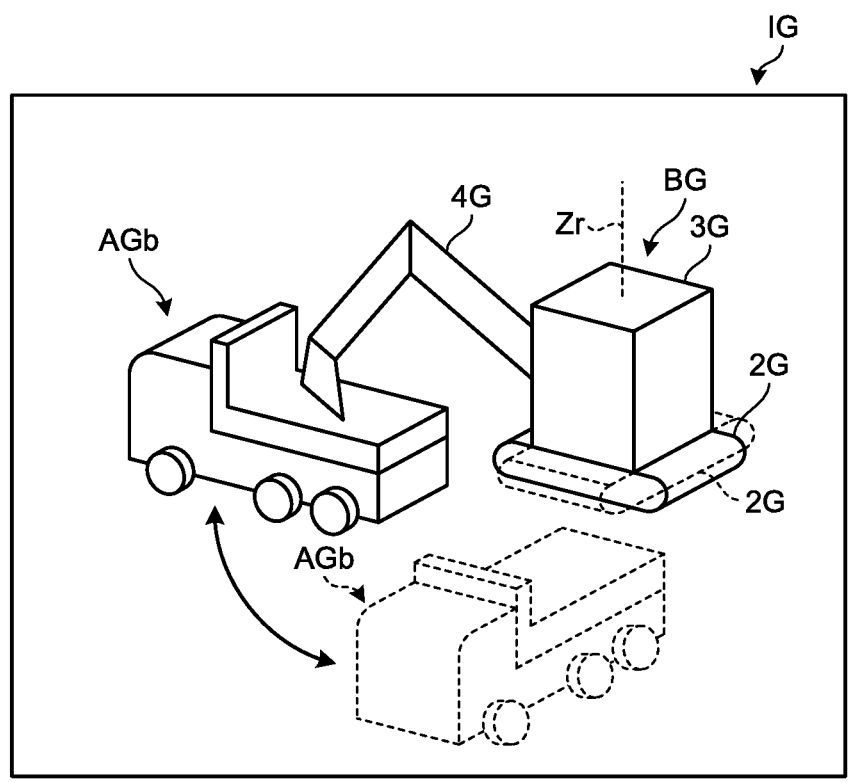
FIG. 15 is a view schematically illustrating an example of a superimposition image according to the present embodiment.

FIG. 15 is a view schematically illustrating an example of the superimposition image IG according to the present embodiment. FIG. 15 illustrates the superimposition image IG including the work machine image BG and the transport vehicle image AGb defined in the vehicle body coordinate system. In the example illustrated in FIG. 15, the display control unit 93 causes the work machine image BG and the transport vehicle image AGb viewed from the virtual viewpoint fixed in the vehicle body coordinate system to be displayed on the display apparatus 80. The virtual viewpoint is fixed in the vehicle body coordinate system. Therefore, in a case where the swing body 3 swivels in a state where the carriage 2 of the excavator 1 is stopped, the swing body image 3G out of the work machine image BG is displayed as being stopped, and the carriage image 2G is displayed as swiveling around the swivel axis Zr. Furthermore, the transport vehicle image AGb is also displayed as swiveling around the swivel axis Zr.

Figure 16:
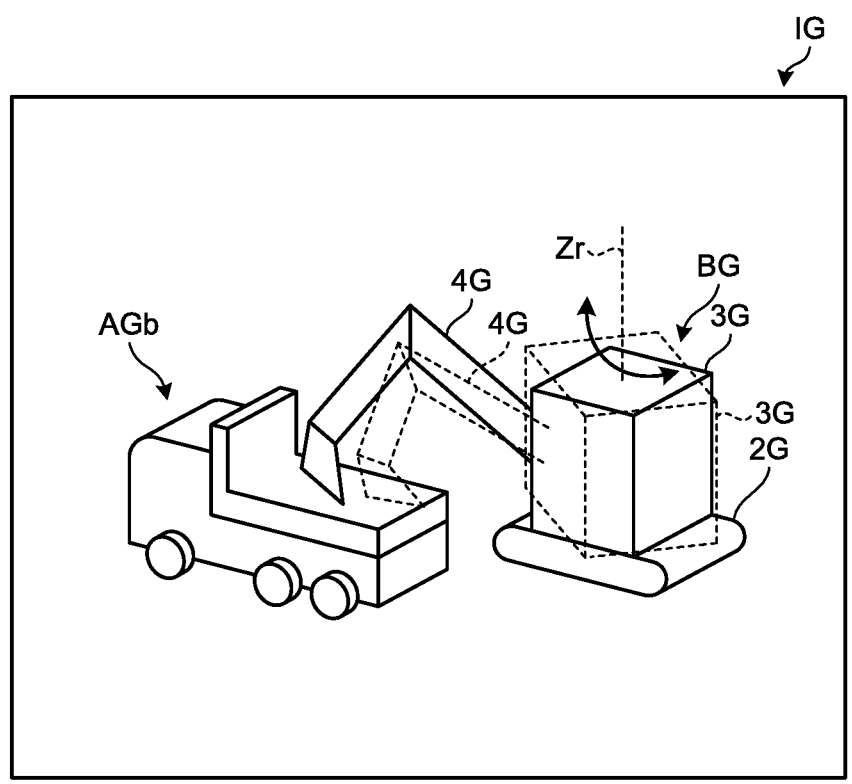
FIG. 16 is a view schematically illustrating an example of a superimposition image according to the present embodiment.

FIG. 16 is a view schematically illustrating an example of the superimposition image IG according to the present embodiment. FIG. 16 illustrates the superimposition image IG including the work machine image BG and the transport vehicle image AGb defined in the global coordinate system. In the example illustrated in FIG. 16, the display control unit 93 causes the work machine image BG and the transport vehicle image AGb viewed from the virtual viewpoint fixed in the global coordinate system to be displayed on the display apparatus 80. The virtual viewpoint is fixed in the global coordinate system. Therefore, in a case where the swing body 3 swivels in a state where the carriage 2 of the excavator 1 is stopped, the carriage image 2G out of the work machine image BG is displayed as being stopped, and the swing body image 3G is displayed as swiveling around the swivel axis Zr. In addition, in a case where the transport vehicle WAb is stopped, the transport vehicle image AGb is displayed as being stopped.

[Effects]

As described above, according to the present embodiment, the work machine image BG viewed from the virtual viewpoint outside the excavator 1 is generated on the basis of the detection data of the position detection device 30 and the detection data of the attitude detection device 40. Furthermore, the transport vehicle image AGb viewed from a virtual viewpoint outside the excavator 1 and the transport vehicle WAb is generated on the basis of the detection data of the position detection device 430 and the detection data of the attitude detection device 440. The work machine image BG and the transport vehicle image AGb are three-dimensional computer graphic images, and the superimposition image IG including the work machine image BG and the transport vehicle image AGb is displayed on the display apparatus 80. The operator can obtain perspective of the work site by viewing the work machine image BG and the transport vehicle image AGb displayed on the display apparatus 80. This enables the operator to easily grasp the distance between the transport vehicle WAb and the excavator 1, particularly the distance between the loading platform 401 of the transport vehicle WAb and the bucket 8 of the excavator 1. This enables the operator to operate the remote controller 70 and use the working equipment 4 of the excavator 1 to smoothly perform loading work onto the transport vehicle WAb. This leads to suppression of reduction in the remote control work efficiency.

According to the present embodiment, the superimposition image IG is an image in which the work machine image BG and the transport vehicle image AGb are superimposed. In the present embodiment, when there is movement in the carriage 2, the swing body 3, and the working equipment 4, the carriage image 2G, the swing body image 3G, and the working equipment image 4G move in synchronization on the superimposition image IG. When there is movement in the transport vehicle WAb, the transport vehicle image AGb moves in synchronization on the superimposition image IG. Therefore, when the operator moves at least one of the carriage 2, the swing body 3, and the working equipment 4, or when the transport vehicle WAb moves, at least one of the carriage image 2G, the swing body image 3G, and the working equipment image 4G will move in a state of being superimposed on the transport vehicle image AGb. Therefore, by viewing the superimposition image IG in which the work machine image BG and the transport vehicle image AGb are superimposed, the operator can easily perceive perspective between at least one of the carriage 2, the swing body 3, and the working equipment 4, in the moving state, and the transport vehicle WAb.

Furthermore, in the present embodiment, not only the work machine image BG and the transport vehicle image AGb, but also the target image AGa of the target WAa of the work site including the construction target is displayed in the superimposition image IG. This enables the operator to easily grasp the distance between the target WAa and the excavator 1. Therefore, the operator can operate the remote controller 70 to smoothly construct the target WAa with the working equipment 4 of the excavator 1.

Furthermore, according to the present embodiment, the distance detection device 20, the position detection device 30, the attitude detection device 40, and the imaging device 50 are mounted on the excavator 1. For example, in a case where the distance detection device is installed outside the excavator 1, it would be necessary to separately prepare the distance detection device or to perform installation work of the distance detection device. This case might increase the device cost or decrease the work efficiency. With the distance detection device 20 mounted on the excavator 1, it is not necessary to separately prepare the distance detection device, and it is not necessary to perform the installation work for the distance detection device. This leads to suppression of the device cost and suppression of a decrease in work efficiency. Moreover, with the distance detection device 20 mounted on the excavator 1, it is not necessary to perform the installation work for the distance detection device even in a case where the position of the target WAa (construction target) gradually changes. The similar applies to the position detection device 30, the attitude detection device 40, and the imaging device 50.

Furthermore, in the present embodiment, the superimposition image IG including the work machine image BG and the transport vehicle image AGb is displayed on a part of the display screen of the display apparatus 80 including the real image RG captured by the imaging device 50. By superimposing the superimposition image IG on a part of the real image RG, the operator can view the superimposition image IG without significantly moving the line of sight while watching the real image RG. Therefore, the operator can feel a sense of security and can perform smooth operation.

Furthermore, in the present embodiment, the real image RG to which the superimposition image IG is superimposed includes the image of the working equipment 4. That is, the superimposition image IG is superimposed on the real image RG in the +Xm direction of the swing body 3. The operator can grasp the work status of the working equipment 4 by viewing the real image RG, and can grasp the distance between the transport vehicle WAb and the working equipment 4 by viewing the superimposition image IG. In the case of working using the working equipment 4, the operator operates the remote controller 70 while viewing the real image of the working equipment 4. Therefore, by superimposing the superimposition image IG on a part of the real image RG including the real image of the working equipment 4, the operator can view the superimposition image IG without significantly moving the line of sight while watching the real image RG. This enables the operator to perform operation smoothly, leading to suppression of reduction in work efficiency. Furthermore, the real image of the working equipment 4 and the superimposition image IG are displayed at different positions on the display screen of the display apparatus 80. With this configuration, the real image of the working equipment 4 would not be blocked by the superimposition image IG, the operator can smoothly view both the real image of the working equipment 4 and the superimposition image IG.

According to the present embodiment, the work machine image BG and the transport vehicle image AGb are displayed in a predetermined single coordinate system. With this configuration, the operator can easily grasp the distance and relative position between the excavator 1 and the transport vehicle image AGb by viewing the work machine image BG and the transport vehicle image AGb.

With the configuration in which the work machine image BG and the transport vehicle image AGb are generated in the vehicle body coordinate system, and the work machine image BG and the transport vehicle image AGb viewed from the virtual viewpoint fixed in the vehicle body coordinate system are displayed, the swing body image 3G is displayed as being stopped and the carriage image 2G and the transport vehicle image AGb are displayed as swiveling together with the swivel of the swing body 3, as described with reference to FIG. 15. With this configuration, the operator can obtain a bird's eye view of the situation of the work site with respect to the swing body 3.

In addition, with the configuration in which the work machine image BG and the transport vehicle image AGb are generated in the global coordinate system, and the work machine image BG and the transport vehicle image AGb viewed from the virtual viewpoint fixed in the global coordinate system are displayed, the carriage image 2G and the transport vehicle image AGb are displayed as being stopped and the swing body image 3G is displayed as swiveling together with the swivel of the swing body 3, as described with reference to FIG. 16. With this configuration, the operator can obtain a bird's eye view of the situation of the work site with respect to the carriage 2 and the transport vehicle image AGb.

According to the present embodiment, the work machine image BG includes not only the image of the working equipment 4 but also the image of the swing body 3. Therefore, when the operator views the target image AGa displayed on the display apparatus 80, the operator can grasp not only the operation status of the working equipment 4 and the distance between the target WAa and the working equipment 4 but also the swivel status of the swing body 3 and the relative position between the target WAa and the swing body 3. Since there are provided the swing body attitude sensor 41 that detects the attitude of the swing body 3 and the working equipment attitude sensor 42 that detects the attitude of the working equipment 4, the swing body image 3G is displayed so as to interlock with the actual swivel of the swing body 3 on the basis of detection data of the swing body attitude sensor 41, and the working equipment image 4G is displayed so as to interlock with the actual operation of the working equipment 4 on the basis of detection data of the working equipment attitude sensor 42. With this configuration, the operator can obtain a bird's eye view of the attitude and operating status of the excavator 1.

In the above embodiment, the attitude detection device 440 including the IMU is mounted on the transport vehicle WAb, and the attitude detection device 440 detects the attitude (roll angle $\theta 4$, pitch angle $\theta 5$, and yaw angle $\theta 6$) of the transport vehicle WAb. As the attitude of the transport vehicle WAb, the yaw angle $\theta 6$ may be detected and the roll angle $\theta 4$ and the pitch angle $\theta 5$ need not be detected. In the loading work, the transport vehicle WAb is often positioned on the ground substantially parallel to the horizontal plane, and the roll angle $\theta 4$ and the pitch angle $\theta 5$ are often close to zero. Therefore, the transport vehicle image AGb may be displayed on the basis of the detection data of the yaw angle $\theta 6$ in a state where the roll angle $\theta 4$ and the pitch angle $\theta 5$ are regarded as zero.

Figure 17:
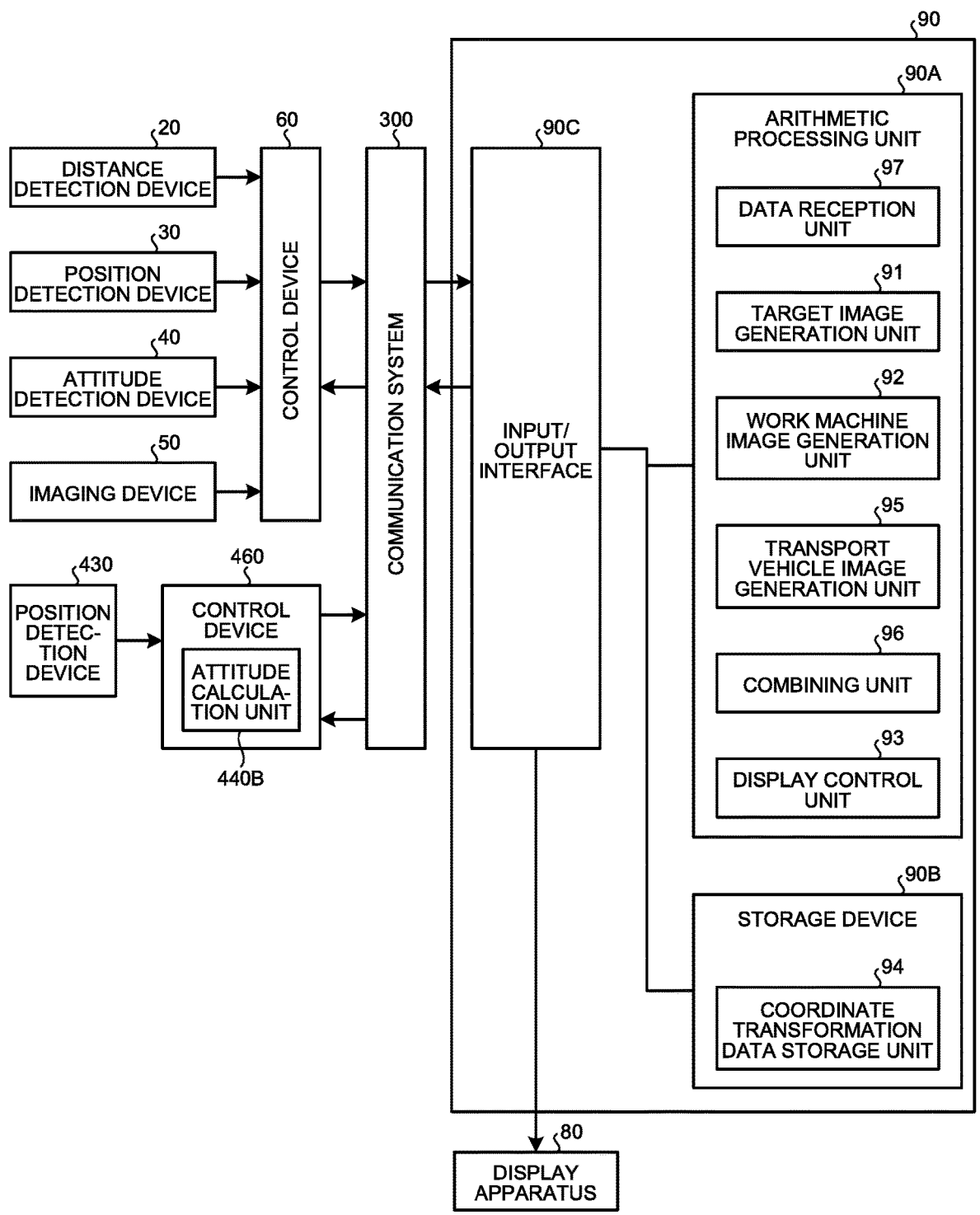
FIG. 17 is a functional block diagram illustrating an example of a control device according to the present embodiment.

As illustrated in FIG. 17, the attitude detection device 440 may be omitted. As described above, the yaw angle $\theta 6$ can be detected by the position detection device 430. In FIG. 17, detection data of the position detection device 430 is output to the control device 460. The arithmetic processing unit 460A of the control device 460 includes an attitude calculation unit 440B that calculates the yaw angle $\theta 6$ on the basis of the detection data of the position detection device 430. As described with reference to FIG. 5 and FIG. 6 or the like, in a case where at least two GPS antennas 431 are provided in the transport vehicle WAb, the attitude calculation unit 440B can detect the orientation of the vehicle body 402 with respect to the reference orientation in the global coordinate system on the basis of the position of one GPS antenna 431 and the position of the other GPS antenna 431. The attitude calculation unit 440B performs arithmetic processing on the basis of the position of one GPS antenna 431 and the position of the other GPS antenna 431, and detects the orientation of vehicle body 402 with respect to the reference orientation. The angle between the reference orientation and the orientation of the vehicle body 402 corresponds to the yaw angle $\theta 6$. The attitude calculation unit 440B can calculate a straight line connecting the position of one GPS antenna 431 and the position of the other GPS antenna 431, and can detect the yaw angle $\theta 6$ on the basis of the angle formed by the calculated straight line and the reference orientation. The number of GPS antennas 431 (position detection device 430) provided in the transport vehicle WAb may be one. The attitude calculation unit 440B can derive a movement trajectory of the transport vehicle WAb in the horizontal plane on the basis of detection data of one position detection device 430. The direction of the tangent of the movement trajectory of the transport vehicle WAb with respect to the reference orientation corresponds to the yaw angle $\theta 6$. The attitude calculation unit 440B can detect the yaw angle $\theta 6$ on the basis of the tangent of the movement trajectory derived on the basis of the detection data of one position detection device 430.

In the above embodiment, the three-dimensional shape of the target image AGa and the image captured by the imaging device 50 may be displayed in an overlapping state, in the superimposition image IG. As described above, by transforming the position Pd in the three-dimensional shape of the target WAa detected by the distance detection device 20 into the position Pc in the image of the imaging device coordinate system, it is possible to allow the three-dimensional shape of the target WAa and the image of the target WAa to overlap with each other in the imaging device coordinate system. Furthermore, the position Pd in the three-dimensional shape of the target WAa and the position Pc in the image of the target WAa can be transformed to the position Pm in the vehicle body coordinate system or the position Pg in the global coordinate system.

The above embodiment is a case where the superimposition image IG includes the work machine image BG, the transport vehicle image AGb, and the target image AGa. Alternatively, the superimposition image IG may include the work machine image BG and the transport vehicle image AGb, and need not include the target image AGa. In the above-described embodiment, the distance detection device 20 may be omitted. By displaying the real image RG of the target WAa (construction target) of the work site on the display apparatus 80, the operator can confirm the target WAa by viewing the real image RG of the target WAa.

Meanwhile, since the superimposition image IG includes at least the work machine image BG and the transport vehicle image AGb, the operator can obtain perspective (perception of distance) between the loading platform 401 and the bucket 8. This makes it possible to suppress an occurrence of an unexpected situation in which the loading platform 401 and the bucket 8 are brought into contact in loading work, for example.

The above-described embodiment is a case where the work machine image BG includes the carriage image 2G, the swing body image 3G, and the working equipment image 4G. Alternatively, the work machine image BG may include the swing body image 3G and the working equipment image 4G and need not include the carriage image 2G. The work machine image BG may include the working equipment image 4G, and need not include the carriage image 2G or the swing body image 3G.

The above embodiment in a case where the distance detection device 20 is a laser range finder. The distance detection device 20 is not limited to the laser range finder. The distance detection device 20 may be, for example, an ultrasonic distance sensor or a stereo camera as long as it can detect the three-dimensional shape of the target WAa.

In the above embodiment, the distance detection devices 20 may be provided in plurality. Furthermore, the distance detection device 20 can be used to not only detect the three-dimensional shape of the target WAa in the forward direction of the swing body 3 but also detect at least one of the three-dimensional shape of the target WAa in the right direction of the swing body 3, the three-dimensional shape of the target WAa in the left direction of the swing body 3, and the three-dimensional shape of the target WAa in the backward direction of the swing body 3.

The above embodiment is a case where the working equipment attitude sensor 42 is a stroke sensor. The working equipment attitude sensor 42 is not limited to a stroke sensor. The working equipment attitude sensor 42 may be, for example, a rotary sensor, an acceleration sensor, or an optical sensor such as a laser scanner, as long as it can detect the inclination angle of the working equipment 4.

The above embodiment is a case where the imaging device 50 is a monocular camera. The imaging device 50 is not limited to a monocular camera. The imaging device 50 may be, for example, a stereo camera having a function of detecting a three-dimensional shape of the target WAa and a function of obtaining an image.

In the above embodiment, the imaging devices 50 may be provided in plurality. Furthermore, the imaging device 50 can be used to not only obtain an image of the target WAa in the forward direction of the swing body 3 but also obtain at least one of an image of the target WAa in the right direction of the swing body 3, an image of the target WAa in the left direction of the swing body 3, and an image of the target WAa in the backward direction of the swing body 3.

In the above embodiment, at least one of the distance detection device 20, the position detection device 30, the attitude detection device 40, and the imaging device 50 may be installed outside the excavator 1 without being mounted on the excavator 1.

The above embodiment is a case where the position Pb of the transport vehicle WAb is detected using GNSS. The position of the transport vehicle WAb may be detected on the basis of a stereo camera, a laser distance detector, or the like, mounted on the excavator 1, for example, or detected by a GNSS function of a smartphone, etc. possessed by the driver of the transport vehicle WAb.

In the above embodiment, at least one of the position detection device 430 and the attitude detection device 440 may be installed outside the transport vehicle WAb without being mounted on the transport vehicle WAb.

In the above embodiment, the virtual viewpoint may move. That is, the display control unit 93 may control to display the superimposition image IG including the work machine image BG and the transport vehicle image AGb viewed from the virtual viewpoints set at each of a plurality of different positions, on the display apparatus 80. For example, the superimposition image IG may be a free viewpoint image. The free viewpoint image refers to an image viewed from a certain virtual viewpoint that has been set, at an arbitrary position, toward a target (excavator 1 and transport vehicle 2).

The above embodiment is a case where the detection data of the distance detection device 20, the detection data of the position detection device 30, and the detection data of the attitude detection device 40 are transmitted to the control device 90 via the communication system 300, and the work machine image BG and the transport vehicle image AGb are generated on the control device 90 and displayed on the display apparatus 80. Alternatively, at least one of the work machine image BG and the transport vehicle image AGb may be generated by the control device 60 mounted on the excavator 1, and at least one of the generated work machine image BG and the transport vehicle image AGb may be transmitted to the control device 90 via the communication system 300 and displayed on the display apparatus 80.

The above embodiment is a case where the detection data of the position detection device 430, and the detection data of the attitude detection device 440 are transmitted to the control device 90 via the communication system 300, and the transport vehicle image AGb is generated on the control device 90 and displayed on the display apparatus 80. Alternatively, the transport vehicle image AGb may be generated by the control device 460 mounted on the transport vehicle WAb, and the generated transport vehicle image AGb may be transmitted to the control device 90 via the communication system 300 and displayed on the display apparatus 80.

The above embodiment is a case where the superimposition image IG is displayed on part of the display screen of the display apparatus 80 that displays the real image RG of the work site. The display apparatus that displays the real image RG and the display apparatus that displays the superimposition image IG may be different display apparatuses. For example, a sub display apparatus may be disposed adjacent to a main display apparatus, the real image RG may be displayed on the main display apparatus, and the superimposition image IG may be displayed on the sub display apparatus.

The above embodiment is a case where the work machine 1 is an excavator. The work machine 1 only needs to have working equipment and a swing body that supports the working equipment, and is not limited to an excavator. In addition, the work machine 1 only needs to include working equipment and may omit a swing body. For example, the work machine 1 may be a wheel loader or the like.

REFERENCE SIGNS LIST

1 EXCAVATOR (WORK MACHINE)
2 CARRIAGE
2A CRAWLER
2B CRAWLER
3 SWING BODY
4 WORKING EQUIPMENT
5 HYDRAULIC CYLINDER
6 BOOM
7 ARM
8 BUCKET
9 TIP
10 BOOM CYLINDER
11 ARM CYLINDER
12 BUCKET CYLINDER
20 DISTANCE DETECTION DEVICE
30 POSITION DETECTION DEVICE (FIRST POSITION DETECTION DEVICE)
31 GPS ANTENNA
40 ATTITUDE DETECTION DEVICE (FIRST ATTITUDE DETECTION DEVICE)
41 SWING BODY ATTITUDE SENSOR
42 WORKING EQUIPMENT ATTITUDE SENSOR
42A BOOM STROKE SENSOR
42B ARM STROKE SENSOR
42C BUCKET STROKE SENSOR
50 IMAGING DEVICE
60 CONTROL DEVICE
60A ARITHMETIC PROCESSING UNIT
60B STORAGE DEVICE
60C INPUT/OUTPUT INTERFACE
70 REMOTE CONTROLLER
71 WORK LEVER
71L LEFT WORK LEVER
71R RIGHT WORK LEVER
72 CARRIAGE LEVER
72L LEFT CARRIAGE LEVER
72R RIGHT CARRIAGE LEVER
80 DISPLAY APPARATUS
90 CONTROL DEVICE
90A ARITHMETIC PROCESSING UNIT
90B STORAGE DEVICE
90C INPUT/OUTPUT INTERFACE
91 TARGET IMAGE GENERATION UNIT
92 WORK MACHINE IMAGE GENERATION UNIT
93 DISPLAY CONTROL UNIT
94 COORDINATE TRANSFORMATION DATA STORAGE UNIT
95 TRANSPORT VEHICLE IMAGE GENERATION UNIT
96 COMBINING UNIT
97 DATA RECEPTION UNIT
100 REMOTE CONTROL SYSTEM
200 DISPLAY SYSTEM
300 COMMUNICATION SYSTEM
401 LOADING PLATFORM
402 VEHICLE BODY
403 CARRIAGE DEVICE
430 POSITION DETECTION DEVICE (SECOND POSITION DETECTION DEVICE)
440 ATTITUDE DETECTION DEVICE (SECOND ATTITUDE DETECTION DEVICE)
460 CONTROL DEVICE
460A ARITHMETIC PROCESSING UNIT
460B STORAGE DEVICE
460C INPUT/OUTPUT INTERFACE
AGa TARGET IMAGE
BG WORK MACHINE IMAGE
IG SUPERIMPOSITION IMAGE (COMBINED IMAGE)
RG REAL IMAGE
MA DETECTION RANGE
TA IMAGING RANGE
WAa TARGET

WAb TRANSPORT VEHICLE
Zr SWIVEL AXIS

The invention claimed is:

1. A display system comprising:
a work machine image generation unit that generates, on the basis of detection data of a position of a work machine including working equipment and detection data of attitude, of the work machine a work machine image representing a virtual viewpoint image of the work machine, viewed from a virtual viewpoint outside the work machine;
a transport vehicle image generation unit that generates, on the basis of detection data of a position of a transport vehicle and detection data of attitude, of the transport vehicle, a transport vehicle image representing a virtual viewpoint image of the transport vehicle viewed from the virtual viewpoint;
a combining unit that generates a combined image in which the work machine image and the transport vehicle image are superimposed; and
a display control unit that causes the combined image to be displayed on a display apparatus present outside the work machine,
wherein the display control unit causes a real image of the working equipment which is a two-dimensional image captured by an imaging device mounted on the work machine and the combined image which is a three-dimensional bird's eye image to be simultaneously displayed on the display apparatus.

2. The display system according to claim 1, wherein the display control unit causes the real image of the working equipment and the combined image to be displayed at different positions on a display screen of the display apparatus.

3. The display system according to claim 1, wherein the display control unit causes the combined image to be displayed on a predetermined coordinate system.

4. The display system according to claim 3, wherein the coordinate system is a vehicle body coordinate system defined on a swing body that supports the working equipment, and
the display control unit causes the combined image viewed from the virtual viewpoint fixed on the vehicle body coordinate system to be displayed.

5. The display system according to claim 3, wherein the coordinate system is a global coordinate system, and
the display control unit causes the combined image viewed from the virtual viewpoint fixed in the global coordinate system to be displayed.

6. The display system according to claim 1, wherein the attitude of the work machine is detected by a first attitude detection device mounted on the work machine,
the first attitude detection device includes: a working equipment attitude sensor that detects attitude of the working equipment; and a swing body attitude sensor that detects attitude of a swing body that supports the working equipment, and
the work machine image includes an image of the working equipment and an image of the swing body.

7. A display method comprising:
receiving, by a control device, detection data of a position of a work machine including working equipment and detection data of attitude, of the work machine;
receiving, by the control device, detection data of a position of a transport vehicle and detection data of attitude, of the transport vehicle;
wherein the attitude of the transport vehicle is detected by a transport vehicle attitude detection device of the transport vehicle;
generating, by the control device, a work machine image representing a virtual viewpoint image of the work machine, viewed from a virtual viewpoint outside the work machine, on the basis of the detection data of the position of the work machine and the detection data of the attitude of the work machine;
generating, by the control device, a transport vehicle image representing a virtual viewpoint image of the transport vehicle viewed from the virtual viewpoint on the basis of the detection data of the position of the transport vehicle and the detection data of the attitude of the transport vehicle;
generating, by the control device, a combined image in which the work machine image and the transport vehicle image are superimposed; and
causing, by the control device, the combined image to be displayed on a display apparatus present outside the work machine.

8. A display apparatus that displays a combined image in which a work machine image representing a virtual viewpoint image of a work machine including working equipment viewed from a virtual viewpoint outside the work machine and a transport vehicle image representing a virtual viewpoint image of a transport vehicle viewed from the virtual viewpoint are superimposed;
wherein the transport vehicle image is generated on the basis of detection data of a position of the transport vehicle and detection data of attitude of the transport vehicle; and
wherein the attitude of the transport vehicle is detected by a transport vehicle attitude detection device of the transport vehicle.

* * * * *